(12) United States Patent
Kobayashi et al.

(10) Patent No.: US 12,467,758 B2
(45) Date of Patent: Nov. 11, 2025

(54) COMPUTER, VEHICLE, AND SERVER

(71) Applicant: TOYOTA JIDOSHA KABUSHIKI KAISHA, Toyota (JP)

(72) Inventors: Ryosuke Kobayashi, Nagakute (JP);
Tomokazu Maya, Nagoya (JP);
Tsuyoshi Okada, Nagoya (JP);
Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 17/986,159

(22) Filed: Nov. 14, 2022

(65) Prior Publication Data
US 2023/0251099 A1   Aug. 10, 2023

(30) Foreign Application Priority Data

Feb. 10, 2022   (JP) .................. 2022-019540

(51) Int. Cl.
*G01C 21/34* (2006.01)
*B60W 60/00* (2020.01)
*G01C 21/36* (2006.01)

(52) U.S. Cl.
CPC ....... *G01C 21/3476* (2013.01); *B60W 60/001* (2020.02); *G01C 21/3679* (2013.01)

(58) Field of Classification Search
CPC ............ G01C 21/3476; G01C 21/3679; G01C 21/3453; B60W 60/001; G06F 16/9535;
(Continued)

(56) References Cited

U.S. PATENT DOCUMENTS

| | | | |
|---|---|---|---|
| 2006/0062923 A1* | 3/2006 | Dilley ..................... | C09D 5/02 427/156 |
| 2009/0235554 A1* | 9/2009 | MacNeil ................. | B60S 3/002 34/524 |

(Continued)

FOREIGN PATENT DOCUMENTS

| | | | | |
|---|---|---|---|---|
| CN | 112109667 A | | 12/2020 | |
| CN | 113269110 A | * | 8/2021 | ............. G01S 19/42 |

(Continued)

OTHER PUBLICATIONS

Translation of WO-2018230532-A1 (JPWO-2018230532-A1) retrieved from Espacent on Sep. 5, 2024 (Year: 2024).*

(Continued)

*Primary Examiner* — Fadey S. Jabr
*Assistant Examiner* — Faris Asim Shaikh
(74) *Attorney, Agent, or Firm* — Dinsmore & Shohl LLP

(57) ABSTRACT

A computer includes a search unit configured to search for a route from a first point to a second point, and an autonomous driving unit configured to execute autonomous driving of a vehicle along the route found by the search unit. The search unit is configured to execute a first route search for searching for a route that satisfies a first requirement in a case where a predetermined condition is not established. The search unit is configured to execute a second route search for searching for a route that satisfies a second requirement in a case where the predetermined condition is established. The first requirement does not include presence of an automatic car wash machine on the route. The second requirement includes the presence of the automatic car wash machine on the route.

9 Claims, 11 Drawing Sheets

(58) Field of Classification Search
CPC ..... G06F 16/9537; G05D 1/0225; B60S 1/00; B60S 3/00; B60S 3/004; B60S 3/04; B60S 3/041; B60S 3/06; B60S 5/00; B08B 13/00
See application file for complete search history.

(56) References Cited

U.S. PATENT DOCUMENTS

| | | | | |
|---|---|---|---|---|
| 2012/0326463 | A1* | 12/2012 | Hagenbuch | B60P 1/286 977/773 |
| 2016/0138925 | A1* | 5/2016 | Takahashi | B60L 53/665 701/533 |
| 2017/0165971 | A1* | 6/2017 | Igarashi | B41J 2/16508 |
| 2018/0268510 | A1* | 9/2018 | Edakunni | H04W 64/00 |
| 2019/0184946 | A1* | 6/2019 | Friederich | B60S 5/02 |
| 2020/0198594 | A1* | 6/2020 | Petershagen | B60S 5/02 |
| 2020/0349509 | A1* | 11/2020 | Sharma | G06N 5/01 |
| 2020/0401159 | A1* | 12/2020 | Asai | G01C 21/34 |
| 2021/0284103 | A1* | 9/2021 | Yamane | H04L 67/52 |
| 2021/0286356 | A1* | 9/2021 | Yang | G05D 1/0282 |
| 2021/0341583 | A1* | 11/2021 | Adams | B60R 16/02 |
| 2022/0212635 | A1* | 7/2022 | Kurzhals | G06Q 10/06311 |
| 2022/0415098 | A1* | 12/2022 | Haibara | G07C 5/008 |
| 2023/0032915 | A1* | 2/2023 | Suzuki | G08G 1/096775 |
| 2023/0084785 | A1* | 3/2023 | Hagiwara | A47L 9/0063 15/319 |
| 2023/0139003 | A1* | 5/2023 | Bhasme | B60L 58/16 701/533 |
| 2023/0156439 | A1* | 5/2023 | Mayer | B60S 3/066 134/18 |

FOREIGN PATENT DOCUMENTS

| | | | | | |
|---|---|---|---|---|---|
| JP | 11222105 | A | * | 8/1999 | |
| JP | 2020013374 | A | * | 1/2020 | |
| JP | 2020060418 | A | * | 4/2020 | |
| JP | 2020-166760 | A | | 10/2020 | |
| KR | 101767187 | B1 | * | 8/2017 | ........... G06Q 10/109 |
| WO | WO-2018230532 | A1 | * | 12/2018 | ............. G06Q 50/10 |
| WO | 2021/131916 | A1 | | 7/2021 | |

OTHER PUBLICATIONS

Translation of JP-2020013374-A retrieved from Espacent on Sep. 5, 2024 (Year: 2024).*
Translation of JP-2020060418-A retrieved from Espacent on Sep. 5, 2024 (Year: 2024).*
The Real Truth About Ceramic Coatings (Year: 2019).*
Spray-In Liners vs. Drop-In Liners_ Which Is Better_ (Year: 2019).*
The Pros and Cons of Ceramic Coating a Car in Denver _ Colorado Clear Bra (Year: 2021).*
Translation of JPH 11222105 A retrieved from Espacent on Dec. 5, 2024 (Year: 2024).*
Translation of JPWO2018230532A1 retrieved from Espacenet on Jan. 28, 2025 (Year: 2025).*
Translation of CN-113269110-A retrieved from Espacenet on Apr. 18, 2025 (Year: 2025).*
Translation of KR 101767187 B1 retrieved from Espacenet on Apr. 18, 2025 (Year: 2025).*

* cited by examiner

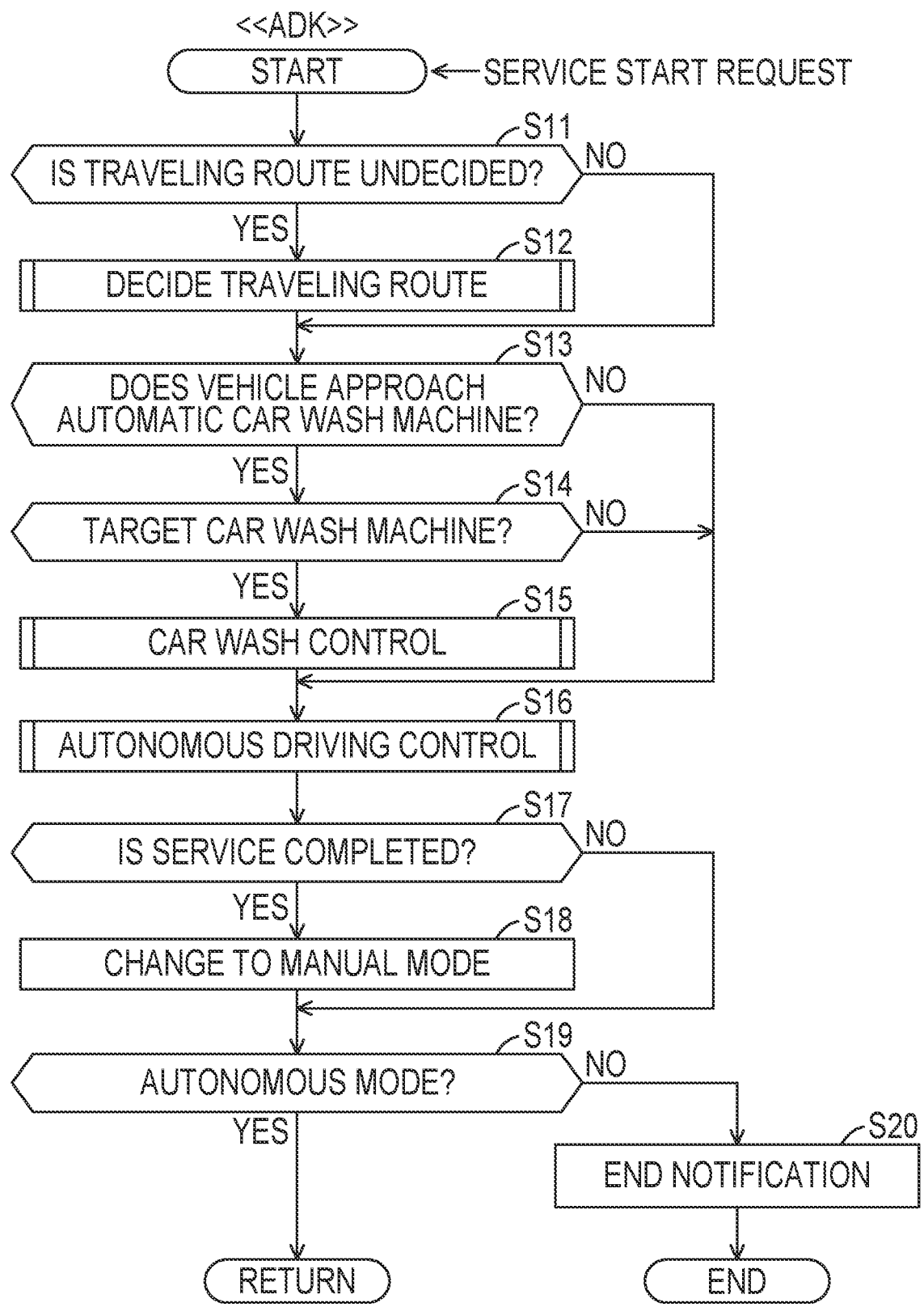

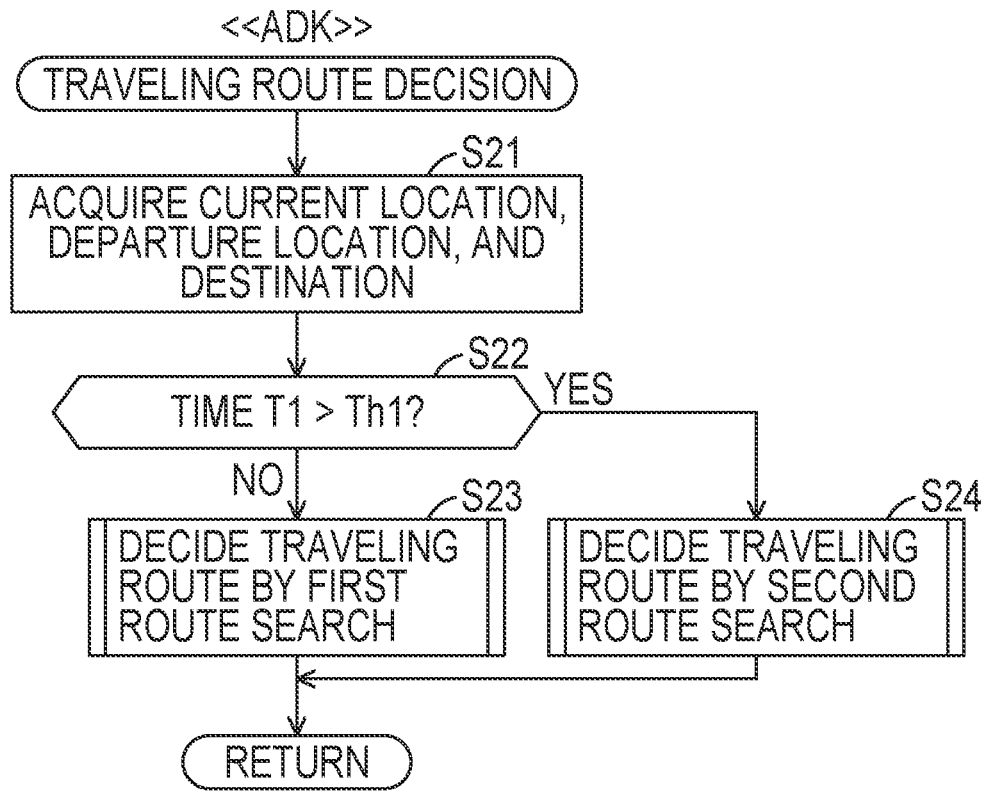
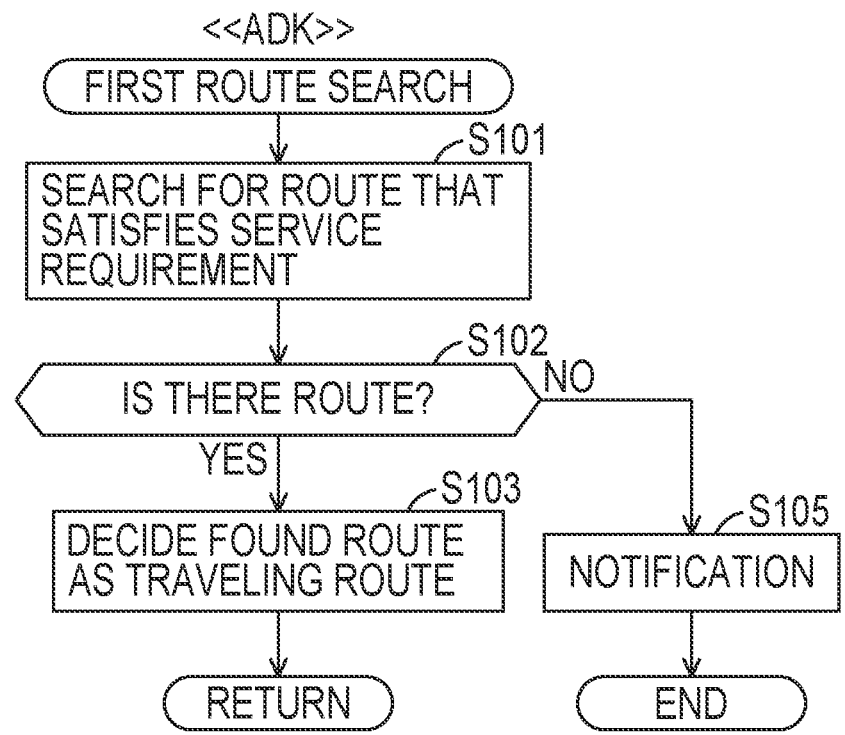

FIG. 12

| ROUTE | ROUTE FROM DEPARTURE LOCATION TO DESTINATION | SERVICE REQUIREMENT | CAR WASH REQUIREMENT |
|---|---|---|---|
| RT-1 | R1 → R2 | A | 0 |
| RT-2 | R1 → R11 → R6 → R10 | - | 0 |
| RT-3 | R1 → R11 → R6 → R13 → R23 | - | 0 |
| RT-4 | R1 → R11 → R22 → R23 | B | 1 |
| RT-5 | R1 → R11 → R22 → R13 → R10 | E | 0 |
| RT-6 | R3 → R4 → R5 → R6 → R10 | - | 1 |
| RT-7 | R3 → R4 → R5 → R6 → R13 → R23 | - | 2 |
| RT-8 | R3 → R4 → R5 → R22 → R23 | - | 2 |
| RT-9 | R3 → R4 → R5 → R22 → R13 → R10 | - | 1 |
| RT-10 | R3 → R4 → R5 → R11 → R2 | - | 1 |
| RT-11 | R3 → R21 → R6 → R10 | - | 0 |
| RT-12 | R3 → R21 → R6 → R13 → R23 | - | 1 |
| RT-13 | R3 → R21 → R22 → R23 | D | 1 |
| RT-14 | R3 → R21 → R22 → R13 → R10 | F | 0 |
| RT-15 | R3 → R21 → R11 → R2 | C | 0 |
| RT-16 | R3 → R4 → R12 → R8 → R9 → R10 | - | 3 |
| RT-17 | R3 → R7 → R8 → R9 → R10 | - | 2 |
| RT-18 | R3 → R7 → R12 → R5 → R6 → R10 | - | 0 |
| RT-19 | R3 → R7 → R12 → R5 → R6 → R13 → R23 | - | 1 |
| RT-20 | R3 → R7 → R12 → R5 → R22 → R23 | - | 1 |
| RT-21 | R3 → R7 → R12 → R5 → R22 → R13 → R10 | - | 0 |
| RT-22 | R3 → R7 → R12 → R5 → R11 → R2 | - | 0 |

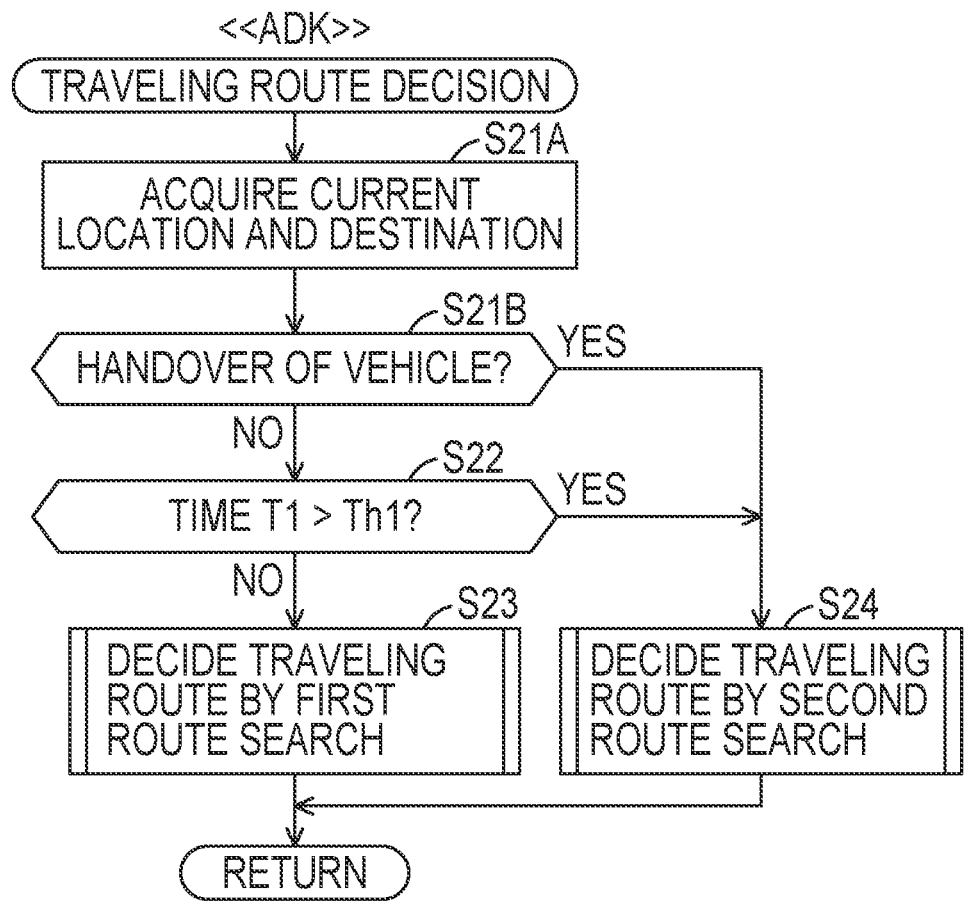
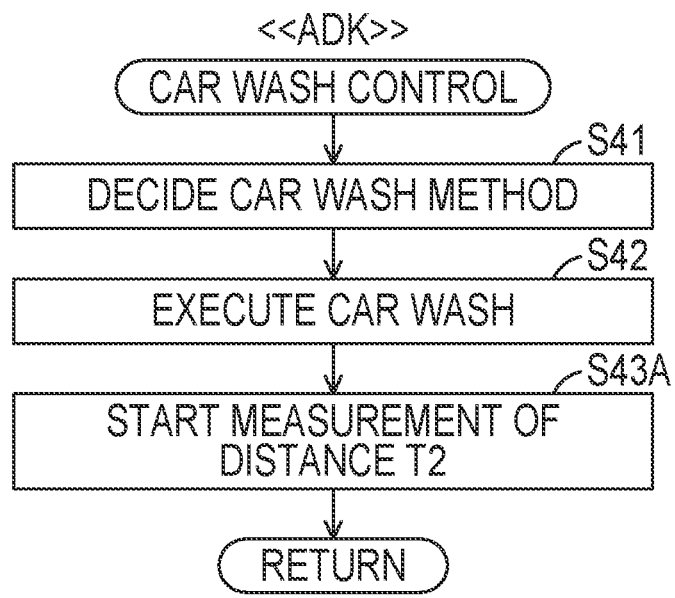

COMPUTER, VEHICLE, AND SERVER

CROSS-REFERENCE TO RELATED APPLICATION

This application claims priority to Japanese Patent Application No. 2022-019540 filed on Feb. 10, 2022, incorporated herein by reference in its entirety.

BACKGROUND

1. Technical Field

The present disclosure relates to a computer, a vehicle, and a server.

2. Description of Related Art

Japanese Unexamined Patent Application Publication No. 2020-166760 (JP 2020-166760 A) discloses a system that determines whether or not maintenance is needed for an autonomous driving vehicle, and reserves a schedule for maintenance work in a case where a determination is made that the maintenance is needed.

SUMMARY

In future, it is considered that, as an autonomous driving technique further advances, a system that automatically provide a service by an autonomous driving vehicle without human intervention will be put into practical use. In such a system, autonomous driving of the vehicle is continuously executed for a long period in order to increase an operating rate of the autonomous driving vehicle, and a wash of the vehicle is likely to be insufficient. There is the probability that the insufficient wash of the vehicle causes a failure and causes annoyance to a service user.

The present disclosure is to facilitate the car wash of the autonomous driving vehicle at an appropriate frequency.

A first aspect of the present disclosure relates to a computer includes a search unit configured to search for a route from a first point to a second point, and an autonomous driving unit configured to execute autonomous driving of a vehicle along the route found by the search unit. The search unit is configured to execute a first route search for searching for a route that satisfies a first requirement in a case where a predetermined condition is not established. The search unit is configured to execute a second route search for searching for a route that satisfies a second requirement in a case where the predetermined condition is established. The first requirement does not include presence of an automatic car wash machine on the route. The second requirement includes the presence of the automatic car wash machine on the route. In the following, the predetermined condition is also referred to as a "car wash route search condition".

With the configuration described above, in a case where the car wash route search condition is not established, the route for autonomous driving is searched for without considering the position of the automatic car wash machine (first route search). On the other hand, in a case where the car wash route search condition is established, the route including the automatic car wash machine is searched for (second route search), and autonomous driving of the vehicle is executed along the route including the automatic car wash machine. Therefore, the car wash of the vehicle can be executed with the automatic car wash machine during autonomous driving. By setting the car wash route search condition such that the car wash route search condition is established at a time when the car wash is needed and not established at a time when the car wash is not needed, a decrease in the operating rate of the vehicle can be suppressed and an insufficient wash of the vehicle can be suppressed. With the computer described above, it is easy to execute the car wash of the autonomous driving vehicle at an appropriate frequency.

It should be noted that the automatic car wash machine is a car wash machine that can be used by the vehicle during autonomous driving while maintaining autonomous driving. The automatic car wash machine may be a drive-through car wash machine or may be other kinds of automatic car wash machine.

The car wash route search condition may be established in a case where a predetermined time has elapsed since a previous car wash of the vehicle. With such a configuration, it is easy for the car wash route search condition to be established at a time when the car wash is needed.

The car wash route search condition may be established in a case where a traveling distance since a previous car wash of the vehicle exceeds a predetermined value. With such a configuration, it is easy for the car wash route search condition to be established at a time when the car wash is needed.

The vehicle may be configured to execute first autonomous driving for a first task, and then execute second autonomous driving for a second task. The car wash route search condition may be established in a route search in which an end point of the first task is the first point and a start point of the second task is the second point. With such a configuration, it is easy for the car wash route search condition to be established at a time when the car wash is needed.

Each of the first requirement and the second requirement may include that the vehicle is able to reach the second point by a predetermined time. With such a configuration, it is easy for the vehicle to reach the second point by a target time (predetermined time).

The autonomous driving unit may be configured to, in a case where a plurality of the routes that satisfies the first requirement is found by the first route search, decide one traveling route from among the routes in accordance with a predetermined first priority criterion, and execute autonomous driving of the vehicle along the decided traveling route. The autonomous driving unit may be configured to, in a case where a plurality of the routes that satisfies the second requirement is found by the second route search, decide one traveling route from among the routes in accordance with a predetermined second priority criterion, and execute autonomous driving of the vehicle along the decided traveling route.

With the configuration described above, in a case where the routes are found by the search unit, one traveling route is automatically decided, and autonomous driving of the vehicle is executed along the traveling route. Therefore, it is possible to easily and smoothly execute autonomous driving of the vehicle.

The first priority criterion may include a criterion regarding a reach time at the second point. The second priority criterion may include a criterion regarding a position of the automatic car wash machine and a criterion regarding the reach time at the second point.

With the configuration described above, it is easy for the vehicle to reach the second point by the target time. In addition, with the configuration described above, it is easy to wash the vehicle at an appropriate position (or at an appropriate time).

It should be noted that it is not always needed that the traveling route is automatically decided, and one traveling route may be selected by the user in a case where the routes are found by the search unit.

Any of the computers described above may further include a car wash unit configured to make a request for a car wash of the vehicle to the automatic car wash machine present on the route on which the autonomous driving unit causes the vehicle to travel by autonomous driving. With such a configuration, it is easy to wash the vehicle by the automatic car wash machine during autonomous driving of the vehicle.

The car wash unit may be configured to decide a target car wash machine from among the automatic car wash machines present on the route on which the autonomous driving unit causes the vehicle to travel by autonomous driving in a case where the second route search is executed. The car wash unit may be configured to make the request for the car wash of the vehicle to the target car wash machine in a case where an automatic car wash machine that the vehicle approaches corresponds to the target car wash machine.

With the configuration described above, the automatic car wash machine (target car wash machine) that meets the needs of the vehicle is selected from among the automatic car wash machines present on an autonomous driving route of the vehicle, and the request for the car wash of the vehicle is made to the target car wash machine.

A second aspect of the present disclosure relates to a vehicle including a control device. The vehicle further includes an autonomous driving kit, and a vehicle control interface configured to mediate exchange of signals between the control device and the autonomous driving kit. The autonomous driving kit is configured to transmit a command for autonomous driving to the control device via the vehicle control interface. The control device is configured to control the vehicle in accordance with the command from the autonomous driving kit. The control device is configured to transmit a signal indicating a state of the vehicle to the autonomous driving kit via the vehicle control interface. Moreover, the control device or the autonomous driving kit includes any of the computers described above.

Since the vehicle described above includes the computer described above, it is possible to facilitate the car wash of the autonomous driving vehicle at an appropriate frequency.

A third aspect of the present disclosure relates to a server including any of the computers described above.

Since the server described above includes the computer described above, it is possible to facilitate the car wash of the autonomous driving vehicle at an appropriate frequency.

A fourth aspect of the present disclosure relates to a mobile terminal including any of the computers described above.

Since the mobile terminal described above includes the computer described above, it is possible to facilitate the car wash of the autonomous driving vehicle at an appropriate frequency.

A fifth aspect of the present disclosure relates to an autonomous driving method including a determination step, a first search step, a second search step, and an autonomous driving step. In the determination step, a determination is made as to whether or not a predetermined condition is established. In the first search step, a first route search for searching for a route that satisfies a first requirement is executed in a case where a predetermined condition is not established. In the second search step, a second route search for searching for a route that satisfies a second requirement is executed in a case where the predetermined condition is established. In the autonomous driving step, autonomous driving of a vehicle is executed along the route found by the first route search or the second route search. The first requirement does not include presence of an automatic car wash machine on the route. The second requirement includes the presence of the automatic car wash machine on the route.

With the autonomous driving method described above, it is possible to facilitate the car wash of the autonomous driving vehicle at an appropriate frequency, as with the computer described above.

According to the present disclosure, it is easy to execute the car wash of the autonomous driving vehicle at an appropriate frequency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart showing an autonomous driving method according to the first embodiment of the present disclosure;

FIG. 5 is a flowchart showing details of processing related to traveling route decision in the autonomous driving method according to the first embodiment of the present disclosure;

FIG. 6 is a flowchart showing details of a first route search shown in FIG. 5;

FIG. 12 is a table showing the success or failure of each service requirement and car wash requirement for each route candidate on the map shown in FIG. 11;

FIG. 13 is a flowchart showing details of processing related to traveling route decision in an autonomous driving method according to a second embodiment of the present disclosure;

FIG. 14 is a flowchart showing a modification example of the processing shown in FIG. 10;

DETAILED DESCRIPTION OF EMBODIMENTS

Figure 1:
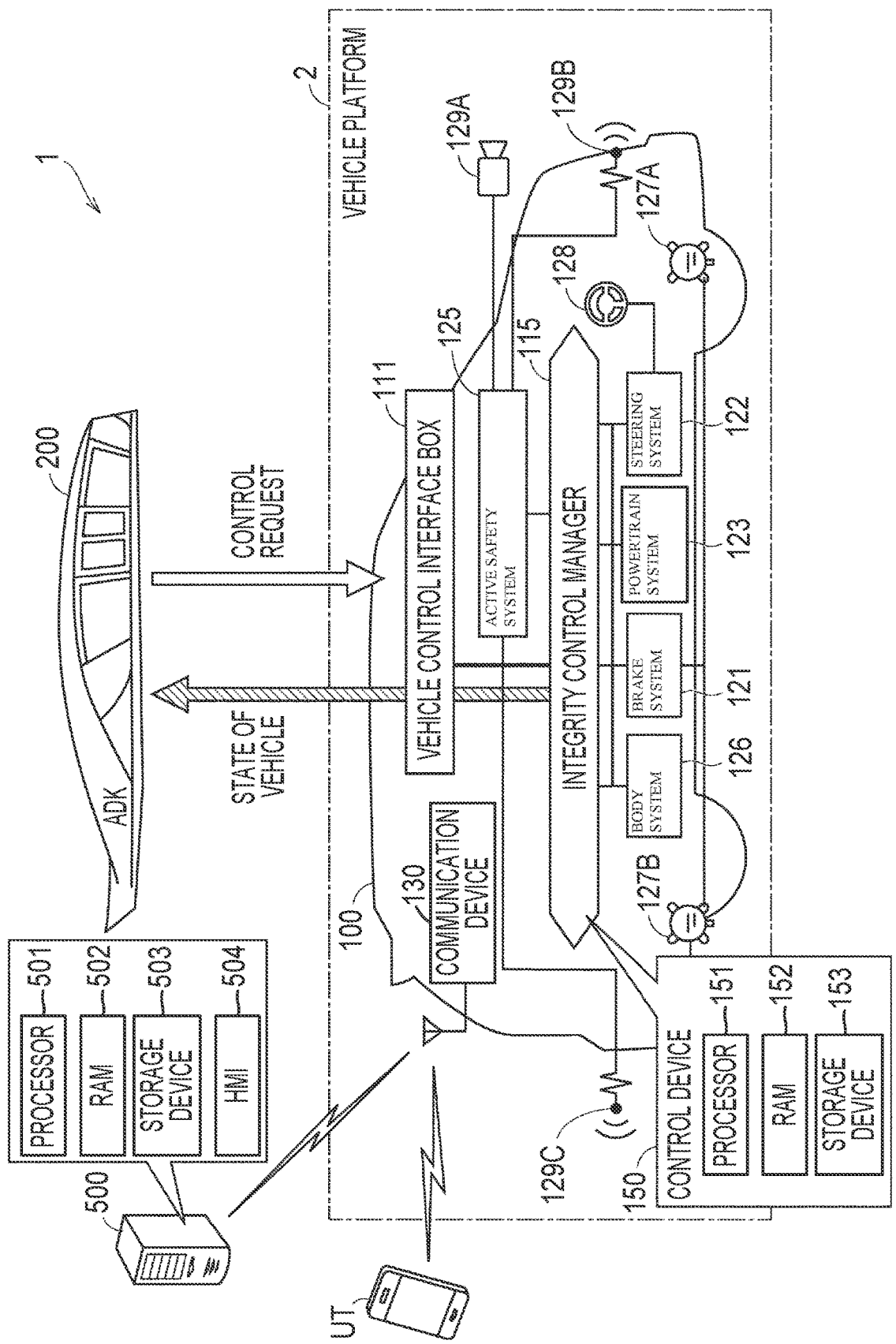
FIG. 1 is a diagram showing a schematic configuration of a vehicle according to a first embodiment of the present disclosure.

In the following, embodiments of the present disclosure will be described in detail with reference to the drawings. It should be noted that, in the drawings, the same or corresponding parts are designated by the same reference signs and the description thereof will not be repeated.

First Embodiment

FIG. 1 is a diagram showing a schematic configuration of a vehicle according to the embodiment of the present disclosure. With reference to FIG. 1, a vehicle 1 includes an autonomous driving kit (hereinafter, referred to as "ADK") 200 and a vehicle platform (hereinafter, referred to as "VP") 2.

The VP 2 includes a control system of a base vehicle 100 and a vehicle control interface box (hereinafter, referred to as "VCIB") 111 provided in the base vehicle 100. The VCIB 111 may communicate with the ADK 200 via an in-vehicle network, such as a controller area network (CAN). It should be noted that, although the base vehicle 100 and the ADK 200 are shown at separate positions in FIG. 1, the ADK 200 is actually attached to the base vehicle 100. In the present embodiment, the ADK 200 is attached to a rooftop of the base vehicle 100. It should be noted that an attachment position of the ADK 200 can be changed as appropriate.

The base vehicle 100 is, for example, a commercially available electrified vehicle (xEV). The xEV is a vehicle that uses electric power as all or part of a power source. In the present embodiment, a battery electric vehicle (BEV) is adopted as the base vehicle 100. It should be noted that the present disclosure is not limited to this, and the base vehicle 100 may be an xEV (REV, PHEV, FCEV, or the like) other than the BEV. The number of wheels provided in the base vehicle 100 is, for example, four. It should be noted that the number of wheels provided in the base vehicle 100 is not limited to this, and may be three or five or more.

The control system of the base vehicle 100 includes, in addition to an integrity control manager 115, various systems and various sensors for controlling the base vehicle 100. The integrity control manager 115 controls various systems related to the operation of the base vehicle 100 in an integrated manner based on signals (sensor detection signals) from various sensors provided in the base vehicle 100.

In the present embodiment, the integrity control manager 115 includes a control device 150. The control device 150 includes a processor 151, a random access memory (RAM) 152, and a storage device 153. As the processor 151, for example, a central processing unit (CPU) can be adopted. The RAM 152 functions as a working memory that transitorily stores the data processed by the processor 151. The storage device 153 is configured to store the stored information. For example, the storage device 153 includes a read only memory (ROM) and a rewritable non-volatile memory. The storage device 153 stores information used in a program (for example, a map, a mathematical formula, and various parameters), in addition to the program. In the present embodiment, the processor 151 executes the program stored in the storage device 153 to execute various vehicle controls (for example, autonomous driving control in response to an instruction from the ADK 200). It should be noted that these pieces of processing may be executed by dedicated hardware (electronic circuit) instead of software. It should be noted that the number of processors provided in the control device 150 is optional, and the processor may be prepared for each predetermined control.

The base vehicle 100 includes a brake system 121, a steering system 122, a powertrain system 123, an active safety system 125, and a body system 126. These systems are controlled in an integrated manner by the integrity control manager 115. In the present embodiment, each system includes the computer. Moreover, the computer for each system communicates with the integrity control manager 115 via the in-vehicle network (for example, the CAN). In the following, the computer provided in each system is referred to as an "electronic control unit (ECU)".

The brake system 121 includes a braking device provided in each wheel of the base vehicle 100, and an ECU that controls the braking device. In the present embodiment, a hydraulic disc brake device is adopted as the braking device. The base vehicle 100 includes wheel speed sensors 127A, 127B. The wheel speed sensors 127A are provided in front wheels of the base vehicle 100 and detect the rotation speed of the front wheels. The wheel speed sensors 127B are provided in rear wheels of the base vehicle 100 and detect the rotation speed of the rear wheels. The ECU of the brake system 121 outputs a rotation direction and the rotation speed of each wheel detected by the wheel speed sensors 127A, 127B to the integrity control manager 115.

The steering system 122 includes a steering device of the base vehicle 100, and an ECU that controls the steering device. The steering device includes, for example, a rack and pinion type electric power steering (EPS) in which a steering angle can be adjusted by an actuator. The base vehicle 100 includes a pinion angle sensor 128. The pinion angle sensor 128 detects a rotation angle (pinion angle) of a pinion gear coupled to a rotation shaft of the actuator constituting the steering device. The ECU of the steering system 122 outputs the pinion angle detected by the pinion angle sensor 128 to the integrity control manager 115.

The powertrain system 123 includes an electric parking brake (EPB) provided in at least one of the wheels provided in the base vehicle 100, a P-Lock device provided in a transmission of the base vehicle 100, a shift device configured to select a shift range, a drive source of the base vehicle 100, and an ECU that controls each device provided in the powertrain system 123. The EPB is provided separately from the braking device described above, and puts the wheels into a fixed state by an electric actuator. For example, the P-Lock device puts a rotation position of an output shaft of the transmission into the fixed state by a parking lock pole that can be driven by the actuator. Although details will be described below, in the present embodiment, a motor that receives electric power supplied from a battery is adopted as the drive source of the base vehicle 100. The ECU of the powertrain system 123 outputs, to the integrity control manager 115, the presence or absence of fixation by each of the EPB and the P-Lock device, the shift range selected by the shift device, and a state of each of the battery and the motor (see FIG. 3 described below).

The active safety system 125 includes an ECU that determines the probability of collision with respect to the traveling vehicle 1. The base vehicle 100 includes a camera 129A and radar sensors 129B, 129C that detect peripheral situations including the front and rear of the vehicle 1. The ECU of the active safety system 125 determines whether or not there is the probability of collision by using the signals received from the camera 129A and the radar sensors 129B, 129C. In a case where the active safety system 125 determines that there is the probability of collision, the integrity control manager 115 outputs a braking command to the brake system 121 to increase a braking force of the vehicle 1. The base vehicle 100 according to the present embodiment includes the active safety system 125 from an initial stage (at the time of shipment). However, the present disclosure is not limited to this, and an active safety system that can be retrofitted to the base vehicle may be adopted.

The body system 126 includes body system components (for example, turn signals, a horn, and a windshield wiper), and an ECU that controls the body system components. The ECU of the body system 126 controls the body system components in response to a user operation in a manual mode, controls the body system components in response to the command received from the ADK 200 via the VCIB 111 and the integrity control manager 115 in an autonomous mode.

The vehicle 1 is configured to execute autonomous driving. The VCIB 111 functions as a vehicle control interface. In a case where the vehicle 1 travels by autonomous driving, the integrity control manager 115 and the ADK 200 exchange signals with each other via the VCIB 111, and the integrity control manager 115 executes traveling control (that is, autonomous driving control) by the autonomous mode in response to the command from the ADK 200. It should be noted that the ADK 200 can also be removed from the base vehicle 100. The base vehicle 100 can travel as a single base vehicle 100 by the user's driving even in a state in which the ADK 200 is removed. In a case where the base vehicle 100 travels as a single base vehicle 100, the control system of the base vehicle 100 executes the traveling control in the manual mode (that is, traveling control in response to the user operation).

In the present embodiment, the ADK 200 exchanges signals with the VCIB 111 in accordance with an application program interface (API) that defines each signal to be communicated. The ADK 200 is configured to process various signals defined by the API described above. For example, the ADK 200 creates a traveling plan of the vehicle 1 and outputs various commands requesting control to cause the vehicle 1 to travel in accordance with the created traveling plan to the VCIB 111 in accordance with the API described above. In the following, each of the various commands described above output from the ADK 200 to the VCIB 111 is also referred to as an "API command". In addition, the ADK 200 receives various signals indicating a state of the base vehicle 100 from the VCIB 111 in accordance with the API, and reflects the received state of the base vehicle 100 in the creation of the traveling plan. In the following, each of the various signals received by the ADK 200 from the VCIB 111 is also referred to as an "API signal". Both the API command and the API signal correspond to the signals defined in the API described above. Details of the configuration of the ADK 200 will be described below (see FIG. 2).

The VCIB 111 receives various API commands from the ADK 200. In a case where the API command is received from the ADK 200, the VCIB 111 converts the API command into a signal format that can be processed by the integrity control manager 115. In the following, the API command converted into the signal format that can be processed by the integrity control manager 115 is also referred to as "control command". In a case where the API command is received from the ADK 200, the VCIB 111 outputs the control command corresponding to the API command to the integrity control manager 115.

The control device 150 of the integrity control manager 115 transmits various signals (for example, a sensor signal or a status signal) indicating the state of the base vehicle 100 detected in the control system of the base vehicle 100 to the ADK 200 via the VCIB 111. The VCIB 111 sequentially receives the signals indicating the state of the base vehicle 100 from the integrity control manager 115. The VCIB 111 decides a value of the API signal based on the signals received from the integrity control manager 115. In addition, the VCIB 111 also converts the signal received from the integrity control manager 115 into an API signal format, as needed. Moreover, the VCIB 111 outputs the obtained API signal to the ADK 200. The API signal indicating the state of the base vehicle 100 is sequentially output from the VCIB 111 to the ADK 200 in real time.

In the present embodiment, a less versatile signal defined by, for example, an automobile manufacturer is exchanged between the integrity control manager 115 and the VCIB 111, and a more versatile signal (for example, a signal defined by an open API) is exchanged between the ADK 200 and the VCIB 111. The VCIB 111 converts the signals between the ADK 200 and the integrity control manager 115 to allow the integrity control manager 115 to execute the vehicle control in response to the command from the ADK 200. It should be noted that the function of the VCIB 111 is not limited to the function of converting the signals described above. For example, the VCIB 111 may make a predetermined determination and transmit signals based on the determination result (for example, signals for notification, instruction, and request) to at least one of the integrity control manager 115 and the ADK 200. Details of the configuration of the VCIB 111 will be described below (see FIG. 2).

The base vehicle 100 further includes a communication device 130. The communication device 130 includes various communication interfaces (I/Fs). The control device 150 is configured to execute communication with an external device of the vehicle 1 (for example, a mobile terminal UT and a server 500 described below) via the communication device 130. The communication device 130 includes a wireless communicator (for example, a data communication module (DCM)) that can access a mobile communication network (telematics). The communication device 130 communicates with the server 500 via the mobile communication network. The wireless communicator may include a communication I/F compatible with fifth-generation mobile communication system (5G). In addition, the communication device 130 also includes a communication I/F for wirelessly communicating with an automatic car wash machine (see FIG. 8 described below) present in the periphery of the vehicle 1. In addition, the communication device 130 includes a communication I/F for directly communicating with the mobile terminal UT present in the vehicle or in a range around the vehicle. The communication device 130 and the mobile terminal UT may execute short-range communication, such as wireless local area network (LAN), near field communication (NFC), or Bluetooth (registered trademark).

The mobile terminal UT is a terminal carried by the user who uses the vehicle 1. In the present embodiment, a smartphone equipped with a touch panel display is adopted as the mobile terminal UT. It should be noted that the present disclosure is not limited to this, any mobile terminal can be adopted as the mobile terminal UT, and a laptop, a tablet terminal, a wearable device (for example, a smartwatch or smart glasses), an electronic key, or the like can also be adopted.

The vehicle 1 can be adopted as one of the components of a mobility-as-a-service (MaaS) system. The MaaS system includes, for example, a mobility service platform (MSPF). The MSPF is a unified platform to which various mobility services (for example, various mobility services provided by a ride sharing business operator, a car sharing business operator, an insurance company, a car rental business operator, a taxi business operator, and the like) are connected. The server 500 is a computer that manages and opens information for the mobility services in the MSPF. The server 500 manages various types of mobility information, and provides information (for example, the API and information on cooperation between mobility) in response to a request from the business operator. The business operator that provides the service can use various functions provided by the MSPF by using the API open on the MSPF. For example, the API needed for the development of the ADK is open on the MSPF.

The server 500 includes a processor 501, a RAM 502, a storage device 503 and a human machine interface (HMI) 504. The storage device 503 is configured to store the stored information. The storage device 503 stores information used in a program (for example, a map, a mathematical formula, and various parameters), in addition to the program. A human machine interface (HMI) 504 includes an input device and a display device. The HMI 504 may be a touch panel display. The HMI 504 may include a smart speaker that receives a voice input.

Figure 2:
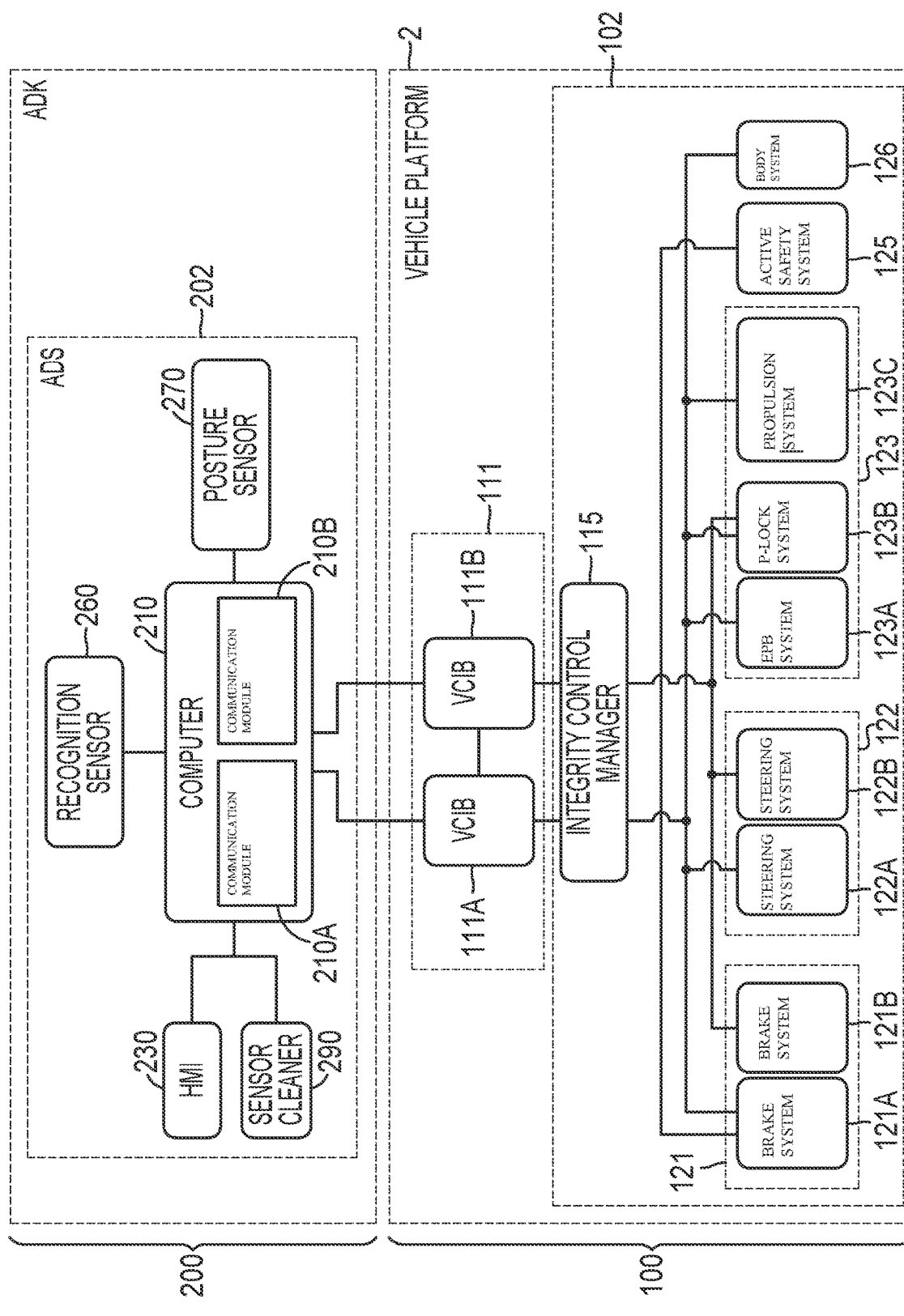
FIG. 2 is a diagram showing details of a control system of the vehicle shown in FIG. 1.

FIG. 2 is a diagram showing details of the control system of the vehicle 1. With reference to FIG. 2 together with FIG. 1, the ADK 200 includes an autonomous driving system (hereinafter, referred to as "ADS") 202 for executing autonomous driving of the vehicle 1. The ADS 202 includes a computer 210, a human machine interface (HMI) 230, a recognition sensor 260, a posture sensor 270, and a sensor cleaner 290.

The computer 210 includes a processor and a storage device that stores autonomous driving software using the API, and is configured to execute the autonomous driving software by the processor. The autonomous driving software executes control related to autonomous driving (see FIG. 4 described below). The autonomous driving software may be updated sequentially by over the air (OTA). The computer 210 further includes communication modules 210A, 210B.

The HMI 230 is a device for exchanging information between the user and the computer 210. The HMI 230 includes an input device and a notification device. Through the HMI 230, the user can make an instruction or a request to the computer 210 or change a value of a parameter used in the autonomous driving software (it should be noted that the change is limited to a parameter that is allowed to be changed). The HMI 230 may be a touch panel display having both functions of the input device and the notification device.

The recognition sensor 260 includes various sensors that acquire information for recognizing an external environment of the vehicle 1 (hereinafter, also referred to as "environmental information"). The recognition sensor 260 acquires the environmental information of the vehicle 1 and outputs the acquired environmental information to the computer 210. The environmental information is used for the autonomous driving control. In the present embodiment, the recognition sensor 260 includes a camera that images the surroundings (including the front and rear) of the vehicle 1 and an obstacle detector (for example, a millimeter wave radar and/or a LiDAR) that detects an obstacle by electromagnetic waves or sound waves. For example, the computer 210 can recognize a person present in a range that can be recognized by the vehicle 1, an object (other vehicles, a pillar, a guardrail, or the like), and a line on a road (for example, a center line) by using the environmental information received from the recognition sensor 260. Artificial intelligence (AI) or an image processing processor may be used for recognition.

The posture sensor 270 acquires information related to a posture of the vehicle 1 (hereinafter, also referred to as "posture information") and outputs the acquired information to the computer 210. The posture sensor 270 includes various sensors that detect the acceleration, the angular velocity, and the position of the vehicle 1. In the present embodiment, the posture sensor 270 includes an inertial measurement unit (IMU) and a global positioning system (GPS) sensor. The IMU detects the acceleration of each of a front-rear direction, a right-left direction, and an up-down direction of the vehicle 1, and the angular velocity of each of a roll direction, a pitch direction, and a yaw direction of the vehicle 1. The GPS sensor detects the position of the vehicle 1 by using signals received from a plurality of GPS satellites. A technique of measuring the posture with high accuracy by combining the IMU and the GPS is known in a field of an automobile and an aircraft. The computer 210 may measure the posture of the vehicle 1 from the posture information described above by using, for example, such a known technique.

The sensor cleaner 290 is a device that removes dirt from the sensor (for example, the recognition sensor 260) that is exposed to the outside air outside the vehicle. For example, the sensor cleaner 290 may be configured to use a cleaning solution and the windshield wiper to clean a lens of the camera and an exit of the obstacle detector.

In the vehicle 1, in order to improve the safety, predetermined functions (for example, braking, steering, and vehicle fixing) are provided with redundancy. A control system 102 of the base vehicle 100 includes a plurality of systems that realizes equivalent functions. Specifically, the brake system 121 includes brake systems 121A, 121B. The steering system 122 includes steering systems 122A, 122B. The powertrain system 123 includes an EPB system 123A and a P-Lock system 123B. Each system includes an ECU. Even in a case where the abnormality occurs in one of the systems that realize the equivalent functions, the other of the systems is operated normally, so that the function works normally in the vehicle 1.

The VCIB 111 includes a VCIB 111A and a VCIB 111B. Each of the VCIBs 111A, 111B includes a computer. The communication modules 210A, 210B of the computer 210 are configured to communicate with the computers of the VCIBs 111A, 111B, respectively. The VCIB 111A and the VCIB 111B are connected to each other to be communicable with each other. Each of the VCIBs 111A, 111B can be operated independently, and even in a case where the abnormality occurs in one of the VCIBs 111A, 111B, the other of the VCIBs 111A, 111B is operated normally, so that the VCIB 111 is operated normally. Both the VCIBs 111A, 111B are connected to each of the systems described above via the integrity control manager 115. It should be noted that, as shown in FIG. 2, connection destinations of the VCIB 111A and the VCIB 111B are partially different.

In the present embodiment, a function of accelerating the vehicle 1 is not provided with redundancy. The powertrain system 123 includes a propulsion system 123C as a system for accelerating the vehicle 1.

Figure 3:
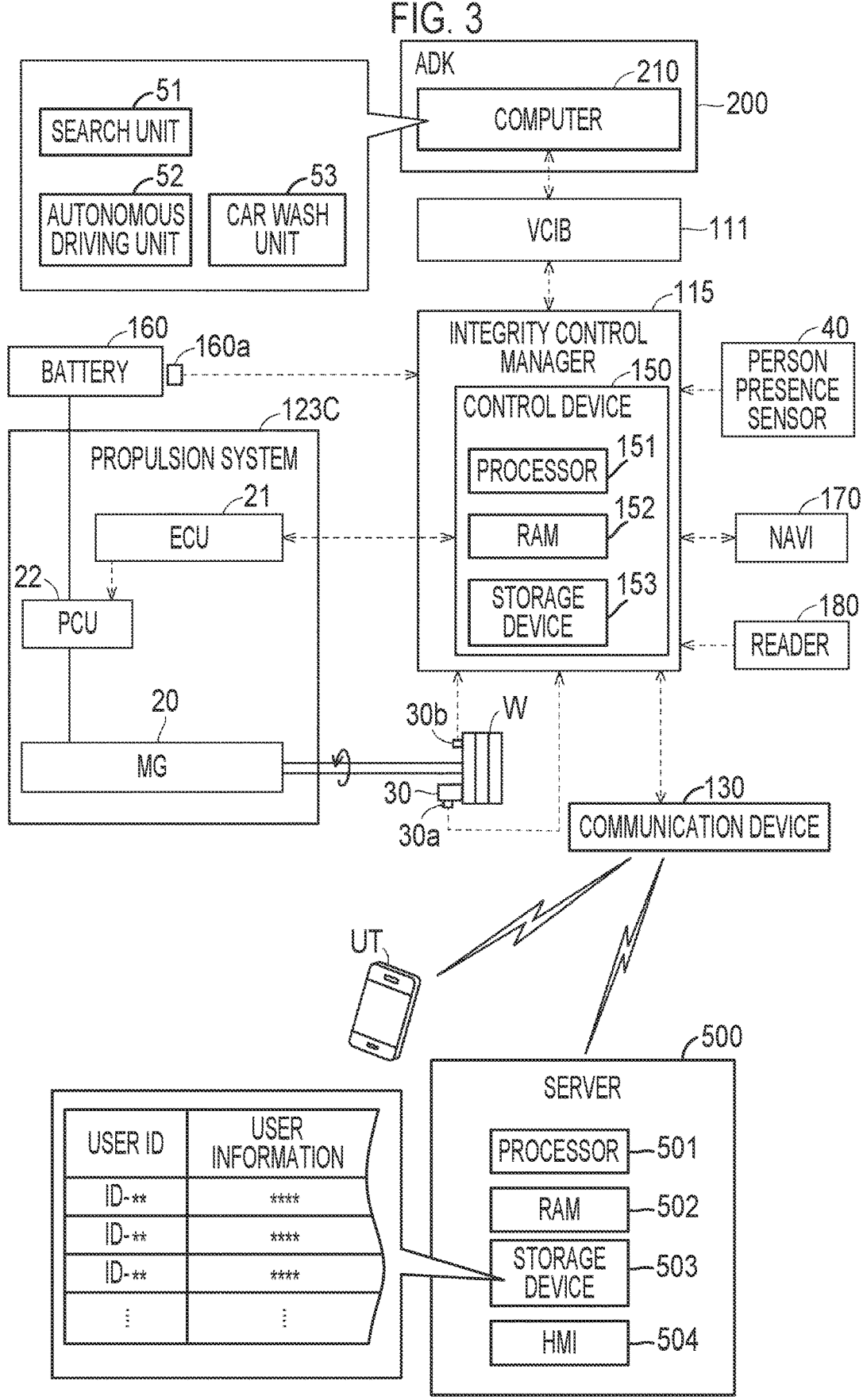
FIG. 3 is a diagram for describing details of a computer and various systems provided in the vehicle according to a first embodiment of the present disclosure.

FIG. 3 is a diagram for describing details of the computer 210 computer and various systems provided in the vehicle 1. With reference to FIG. 3 together with FIGS. 1 and 2, the vehicle 1 includes a motor generator (MG) 20, an ECU 21, a power control unit (PCU) 22, a braking device 30, a brake sensor 30a, an air pressure sensor 30b, a person presence sensor 40, a battery 160, a navigation system (hereinafter, also referred to as "NAVI") 170, a reader 180, and drive wheels W. The MG 20, the ECU 21, and the PCU 22 are provided in the propulsion system 123C. The braking device 30 and the brake sensor 30a are provided in the brake system 121 (FIG. 1).

The battery 160 supplies electric power to the propulsion system 123C. As the battery 160, a known vehicle power storage device (for example, a liquid secondary battery, an all-solid-state secondary battery, or an assembled battery) can be adopted. Examples of the vehicle secondary battery include a lithium ion battery and a nickel-metal hydride battery. The battery 160 is configured to allow contact charging (plug-in charging).

The battery 160 includes a monitoring module 160a. The monitoring module 160a includes various sensors that detect a state of the battery 160 (for example, a voltage, a current, and a temperature), and outputs the detection result to the integrity control manager 115. The monitoring module 160a may be a battery management system (BMS) further having a state-of-charge (SOC) estimation function in addition to the sensor function. The control device 150 can acquire the state of the battery 160 (for example, the temperature, the current, the voltage, and the SOC) based on the output of the monitoring module 160a. The SOC indicates a remaining power storage amount, and for example, a ratio of a current power storage amount to a power storage amount in a fully charged state is represented by 0% to 100%.

The propulsion system 123C generates a traveling driving force of the vehicle 1 by using the electric power stored in the battery 160. For example, the MG 20 is a three-phase alternating current motor generator. The PCU 22 includes, for example, an 20 inverter, a converter, and a relay (hereinafter, referred to as "system main relay (SMR)"). The PCU 22 is controlled by the ECU 21. The SMR is configured to switch connection/disconnection of a power path from the battery 160 to the MG 20. The SMR is put into a closed state (connected state) when the vehicle 1 travels.

The MG 20 is driven by the PCU 22 and rotates a drive wheel W of the vehicle 1. In addition, the MG 20 executes regenerative power generation, and supply the generated electric power to the battery 160. The PCU 22 drives the MG 20 by using the electric power supplied from the battery 160. The number of traveling motors (MGs 20) provided in the vehicle 1 is optional, and may be one, two, or three or more. The traveling motor may be an in-wheel motor. Although solely one drive wheel W is schematically shown in FIG. 3, the number of the drive wheels W and a drive method in the vehicle 1 are optional. The drive method of the vehicle 1 may be any of front-wheel drive, rear-wheel drive, and four-wheel drive.

Each wheel (including the drive wheel W) provided in the vehicle 1 includes a braking device 30, a brake sensor 30a that detects the braking force applied to the wheel by the braking device 30, and the air pressure sensor 30b that detects an air pressure of the tire. The brake sensor 30a may be a hydraulic sensor that detects a hydraulic pressure applied to a brake pad (or a wheel cylinder). The braking force (for example, the hydraulic pressure corresponding to the braking force) for each wheel detected by the four brake sensors 30a are output to the integrity control manager 115. In addition, the detection result of the air pressure sensor 30b is also output to the integrity control manager 115.

The person presence sensor 40 is configured to detect whether or not a person is present in the vehicle 1. More specifically, the person presence sensor 40 acquires information for recognizing an in-vehicle environment of the vehicle 1 and outputs the acquired information to the integrity control manager 115. The person presence sensor 40 includes at least one of an in-vehicle camera and an infrared sensor. The person presence sensor 40 may further include at least one of a seating sensor and a seat belt sensor. The control device 150 can determine whether the vehicle 1 is in any of a manned or unmanned state based on the output of the person presence sensor 40.

The NAVI 170 includes a touch panel display, a GPS module, and a storage device (all not shown). The storage device stores map information. The map information indicates the position of each automatic car wash machine on the map. The touch panel display receives input from the user in the vehicle and displays a map and other information. The GPS module is configured to receive a signal from GPS satellites (not shown) (hereinafter, referred to as "GPS signal"). The NAVI 170 can specify the position of the vehicle 1 by using the GPS signal. The NAVI 170 is configured to display the position of the vehicle 1 on the map in real time. The NAVI 170 is configured to refer to the map information and execute a route search for finding the optimum route (for example, the shortest route) from the current location of the vehicle 1 to the destination. The NAVI 170 may sequentially update the map information by the OTA.

The reader 180 is configured to read predetermined identification information from the image. More specifically, the reader 180 captures the image, extracts a predetermined code from the image, and executes decoding processing. The code extracted from the image is converted into the predetermined identification information by the decoding processing described above. Moreover, the reader 180 outputs the identification information read from the image to the integrity control manager 115. It should be noted that, the reading method of the reader 180 is not limited to the above and is optional. For example, the reader 180 may be a radio frequency identification (RFID) reader.

The vehicle 1 is configured to switch between the autonomous mode and the manual mode. The API signal received by the ADK 200 from the VCIB 111 includes a signal indicating whether the vehicle 1 is in the autonomous mode or the manual mode (hereinafter, referred to as "autonomous state"). The user can select any of the autonomous mode and the manual mode through a predetermined input device (for example, the HMI 230 or the mobile terminal UT). In a case where any of the driving modes is selected by the user, the vehicle 1 is set to the selected driving mode, and the selection result is reflected in the autonomous state. It should be noted that, in a case where the vehicle 1 is not in a state in which autonomous driving can be executed, the driving mode does not shift to the autonomous mode even when the user selects the autonomous mode. In addition, when switching of the driving modes by the user is prohibited, the selection of the driving mode by the user is disabled. Switching of the driving modes of the vehicle 1 may be executed by the integrity control manager 115. The integrity control manager 115 may switch between the autonomous mode and the manual mode in accordance with the instruction from the server 500.

In the present embodiment, a vehicle manager manages the vehicle 1 by using the server 500. Although solely the vehicle 1 is referred to in the present embodiment, the vehicle manager may use the server 500 to manage a number of vehicles. The vehicle manager provides, for example, a passenger transportation service. The server 500 may manage a service usage price for each user. It should be noted that the kind of the service (task) is not limited to the passenger transportation and can be changed as appropriate.

The vehicle 1 provides a service by autonomous driving in a state in which a driver is not present. That is, the vehicle manager is not present in the vehicle 1. Basically, solely a service user gets on the vehicle 1, and in a case where all the service users get off the vehicle, the vehicle 1 is in the unmanned state.

The server 500 can specify the user who is using the vehicle 1 and notify the vehicle manager of information on the user. The server 500 manages the information (user information) on each user registered in the storage device 503. Identification information (user ID) for identifying the user is assigned to each user, and the server 500 manages the user information by distinguishing the user information using the user ID. In the present embodiment, each user registered in the server 500 carries the mobile terminal UT. The user information includes personal information (name, address, age, service usage history, and the like) and an address of the mobile terminal UT carried by the user.

Application software for using the vehicle 1 (hereinafter, referred to as "mobile application") is installed in the mobile terminal UT. In a case where the user uses the vehicle 1, the mobile terminal UT displays the image including the identification information (user ID) of the user. Moreover, in a case where the user holds the mobile terminal UT that displays the image over the reader 180 of the vehicle 1, the user ID read by the reader 180 is transmitted from the vehicle 1 to the server 500. Based on the received user ID, the server 500 executes user authentication and specifies the user who is using the vehicle 1. The server 500 acquires the user information corresponding to the user ID from the storage device 503 and displays the acquired user information on the HMI 504 in response to a request from the vehicle manager. In addition, the server 500 transmits the information on the user who is using the vehicle 1 to the vehicle 1 in response to a request from the vehicle 1.

In the present embodiment, the computer 210 of the ADK 200 includes a search unit 51, an autonomous driving unit 52, and a car wash unit 53. The search unit 51 is configured to search for a route from a first point to a second point. Specifically, the search unit 51 executes a first route search (see S23 of FIG. 5 described below) in a case where a predetermined condition is not established, and executes a second route search (see S24 of FIG. 5 described below) in a case where the predetermined condition is established. The autonomous driving unit 52 is configured to execute autonomous driving of the vehicle 1 along the route found by the search unit 51. The car wash unit 53 is configured to make a request for a car wash of the vehicle 1 to the automatic car wash machine present on the route on which the autonomous driving unit 52 causes the vehicle 1 to travel by autonomous driving. In the present embodiment, the search unit 51, the autonomous driving unit 52, and the car wash unit 53 are embodied by the processor 151 and a program executed by the processor 151. It should be noted that the present disclosure is not limited to this, and each of these units may be embodied by dedicated hardware (electronic circuit).

The server 500 transmits a signal for requesting the start of autonomous driving (hereinafter, also referred to as "service request signal") to the vehicle 1 when the service provision is started. The service request signal includes information on the requested service. In the present embodiment, regarding the autonomous driving requested to the vehicle 1, the service request signal includes a departure location, a reach time at the departure location (hereinafter, also referred to as "request departure time"), a destination, and a reach time at the destination (hereinafter, also referred to as "request reach time"). The service request signal requests a route search in which the current location of the vehicle 1 is a first point (start point) and the destination is a second point (end point) and autonomous driving to the vehicle 1. Further, the service request signal requests the vehicle 1 to reach the departure location by the request departure time, pick up the user at the departure location, and reach the destination by the request reach time. In the following, what is requested by the service request signal is also referred to as "service requirement".

In a case where the vehicle 1 receives the service request signal, the integrity control manager 115 puts the vehicle 1 into the autonomous mode, and then the ADK 200 starts a series of processing shown in FIG. 4 described below. FIG. 4 is a flowchart showing an autonomous driving method according to the first embodiment. In the following, each step in the flowchart is simply referred to as "S".

With reference to FIG. 4 together with FIGS. 1 to 3, in S11, the computer 210 determines whether or not the traveling route is undecided. In a case where the traveling route is not decided (YES in S11), the computer 210 decides the traveling route in S12. The processing of S12 is basically executed while the vehicle 1 is stopped. FIG. 5 is a flowchart showing the details of S12.

With reference to FIG. 5 together with FIGS. 1 to 3, in S21, the computer 210 acquires the current location, the departure location, and the destination. In the present embodiment, the departure location and the destination are indicated by the service request signal. The computer 210 may acquire the current location of the vehicle 1 by using the output of the posture sensor 270 or the NAVI 170, for example.

In S22, the computer 210 determines whether or not time T1 exceeds a predetermined threshold value (hereinafter, referred to as "Th1"). Time T1 is stored, for example, in a storage device of the computer 210. Time T1 corresponds to an elapsed time since a previous car wash. Although the details will be described below, each time the car wash of the vehicle 1 is executed, time T1 is reset and measurement of time T1 is started (S43 of FIG. 10).

Th1 may be a fixed value or may be variable. The computer 210 may decide Th1 by using at least one of weather information and the kind of the task of the vehicle 1.

A car wash frequency needed by the vehicle 1 tends to be changed depending on the weather. For example, the needed car wash frequency when the weather is rainy tends to be lower than the car wash frequency when the weather is sunny. In addition, after rain or when snow is accumulated, the needed car wash frequency tends to be higher. The computer 210 may decide an appropriate Th1 based on the weather information such that the car wash frequency of the vehicle 1 is an appropriate frequency. The computer 210 may acquire the weather information through the Internet.

The car wash frequency needed by the vehicle tends to be changed also depending on the kind of the task. For example, the needed car wash frequency in a passenger transportation task tends to be higher than the needed car wash frequency in a physical distribution task. The computer 210 may decide an appropriate Th1 based on the kind of the task requested to the vehicle 1 such that the car wash frequency of the vehicle 1 is an appropriate frequency. The kind of the task is indicated, for example, by the service request signal.

In a case where Th1 has not elapsed from the car wash of the vehicle 1 (NO in S22), the computer 210 decides the traveling route of the vehicle 1 in S23 by the first route search (see FIG. 6) described below. On the other hand, in a case where Th1 has elapsed from the car wash of the vehicle 1 (YES in S22), the computer 210 decides the traveling route of the vehicle 1 by the second route search (see FIG. 7) described below, in S24. A YES determination in S22 means that predetermined time (Th1) has elapsed since the previous car wash. In a case where the traveling route of the vehicle 1 is decided in any of S23 and S24, the processing proceeds to S13 of FIG. 4.

FIG. 6 is a flowchart showing details of the first route search. With reference to FIG. 6 together with FIGS. 1 to 3, in S101, the computer 210 searches for a route that satisfies the service requirement indicated by the service request signal among the routes (hereinafter, also referred to as "route candidates") that connect the current location, the departure location, and the destination acquired in S21 of FIG. 5. The route search in S101 corresponds to the first route search.

Specifically, for each route candidate, the computer 210 estimates a first traveling time needed for the vehicle 1 to reach the departure location by traveling by autonomous driving, a getting-on time needed for the user to get on the vehicle 1, and a second traveling time needed for the vehicle 1 to travel from the departure location to the destination by autonomous driving. The computer 210 searches for a route on which the vehicle 1 can reach the departure location by the request departure time and can reach the destination by the request reach time, from among the route candidates.

The computer 210 may estimate each of the first traveling time and the second traveling time by using traffic information (for example, congestion information) and a traveling distance. The traveling distance for estimating the first traveling time corresponds to a distance from the current location of the vehicle 1 to the departure location. The traveling distance for estimating the second traveling time corresponds to a distance from the departure location of the vehicle 1 to the destination. In addition, the computer 210 may estimate that the getting-on time is a predetermined time obtained in advance by experiment or simulation. It should be noted that the method of estimating each of the traveling time and the getting-on time is not limited to the above and is optional. For example, the computer 210 may estimate the traveling time solely from the traveling distance without using the traffic information. In addition, the computer 210 may also estimate the getting-on time by using the departure location (getting-on place) and/or a user characteristic (age or the like).

In S102, the computer 210 determines whether or not the route that satisfies the service requirement is found by the first route search (S101). In a case where no route that satisfies the service requirement is found (NO in S102), in S105, a signal indicating that fact (hereinafter, also referred to as "first non-conformity notification") is transmitted from the vehicle 1 (communication device 130) to the server 500 together with the identification information of the vehicle 1. In a case where the processing of S105 is executed, the series of processing shown in FIG. 4 ends together with a series of processing shown in FIG. 6. In this case, autonomous driving by the vehicle 1 is not started. The server 500 that receives the first non-conformity notification may transmit the service request signal to another vehicle for providing the service instead of the vehicle 1.

In a case where the route that satisfies the service requirement is found (YES in S102), the computer 210 decides the found route as the traveling route of the vehicle 1 in S103. In a case where a plurality of routes that satisfies the service requirement is found in S101, one route selected based on a predetermined priority criterion (first priority criterion) is decided as the traveling route of the vehicle 1 in S103. In the present embodiment, the route with the earlier reach time at the destination is preferentially selected. That is, the route with the earlier reach time at the destination among the routes that satisfy the service requirement is decided as the traveling route of the vehicle 1. In a case where the processing of S103 is executed, the series of processing shown in FIG. 6 (S23 of FIG. 5) ends, and the processing proceeds to S13 of FIG. 4.

In the present embodiment, the processing of S101, S102, and S105 is executed by the search unit 51. Moreover, the processing of S103 is executed by the autonomous driving unit 52. In a case where the routes that satisfy the service requirement (first requirement) are found by the first route search, the autonomous driving unit 52 decides one traveling route from among the routes in accordance with the predetermined first priority criterion (S103). Moreover, the autonomous driving unit 52 executes autonomous driving of the vehicle 1 along the decided traveling route in S16 of FIG. 4 described below. Due to such processing, it is possible to easily and smoothly execute autonomous driving of the vehicle 1. It should be noted that the first priority criterion is not limited to the criterion regarding the reach time at the destination. For example, in a case where a remaining energy amount (for example, remaining power storage amount) of the vehicle 1 is lower than a predetermined level, the criterion regarding the position of electric vehicle supply equipment (EVSE) may be adopted as the first priority criterion. Moreover, the route on which the vehicle 1 can receive needed power supply from the EVSE (more specifically, the EVSE that can be used by the vehicle 1 while maintaining autonomous driving) may be preferentially selected.

Figure 7:
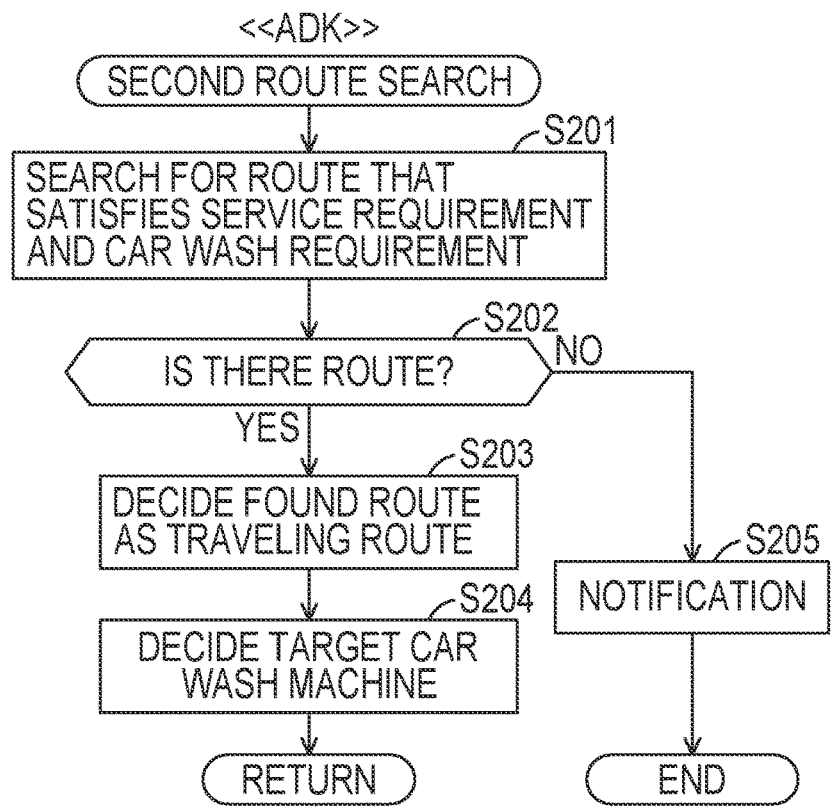
FIG. 7 is a flowchart showing details of a second route search shown in FIG. 5.

FIG. 7 is a flowchart showing details of the second route search. With reference to FIG. 7 together with FIGS. 1 to 3, in S201, the computer 210 searches for a route that satisfies the service requirement indicated by the service request signal and satisfies a predetermined car wash requirement among the route candidates (routes that connect the current location, the departure location, and the destination acquired in S21 of FIG. 5). The route search in S201 corresponds to the second route search. The determination of the success or failure of the service requirement is basically the same as in the first route search (S101 of FIG. 6). It should be noted that, in S201, the computer 210 also considers the time needed for the car wash and determines whether or not the service requirement is satisfied.

The car wash requirement is the presence of a predetermined number of automatic car wash machines on the route. In the present embodiment, the predetermined number is one (fixed value). It should be noted that the presence of the automatic car wash machine on the route means that the automatic car wash machine is present in a roadside site (for example, gasoline station or charging station), in addition to the presence of the automatic car wash machine on the road.

The predetermined number is not limited to one, and may be two or more. In addition, the predetermined number may be variable depending on the situation. For example, the predetermined number may be increased as the elapsed time (time T1) since the previous car wash is increased.

Figure 8:
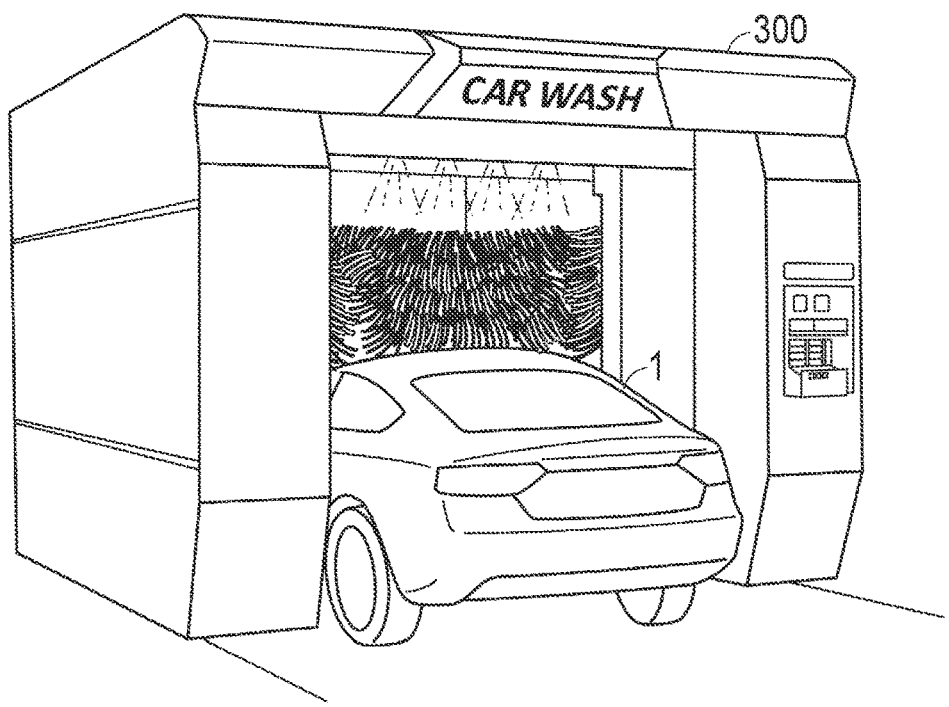
FIG. 8 is a diagram showing an example of an automatic car wash machine.

The automatic car wash machine is a car wash machine that can be used by the vehicle 1 while maintaining autonomous driving. FIG. 8 is a diagram showing an example of the automatic car wash machine. With reference to FIG. 8, an automatic car wash machine 300 is, for example, a drive-through car wash machine. The automatic car wash machine 300 is configured to communicate with the vehicle 1. When the vehicle 1 approaches the automatic car wash machine 300, wireless communication is started between the vehicle 1 and the automatic car wash machine 300. The wireless communication method may be a method using the wireless LAN. It should be noted that the wireless communication method is not limited to this, and any method can be used. The vehicle 1 is moved in accordance with a guide by the automatic car wash machine 300. The automatic car wash machine 300 executes the car wash of the vehicle 1 while issuing a movement instruction to the vehicle 1. The vehicle 1 designates a car wash method to the automatic car wash machine 300 as needed. In a case where the vehicle 1 designates the car wash method, the automatic car wash machine 300 executes the car wash of the vehicle 1 by the designated car wash method.

With reference to FIG. 7 together with FIGS. 1 to 3 again, in S202, the computer 210 determines whether or not the route that satisfies both the service requirement and the car wash requirement is found by the second route search (S201). In a case where no route that satisfies both the service requirement and the car wash requirement is found (NO in S202), in S205, a signal indicating that fact (hereinafter, also referred to as "second non-conformity notification") is transmitted from the vehicle 1 (communication device 130) to the server 500 together with the identification information of the vehicle 1. In a case where the processing of S205 is executed, the series of processing shown in FIG. 4 ends together with a series of processing shown in FIG. 7. In this case, autonomous driving by the vehicle 1 is not started. The server 500 that receives the second non-conformity notification may transmit the service request signal to another vehicle for providing the service instead of the vehicle 1.

In a case where the route that satisfies both the service requirement and the car wash requirement is found (YES in S202), the computer 210 decides the found route as the traveling route of the vehicle 1 in S203. In a case where a plurality of routes that satisfies both the service requirement and the car wash requirement is found in S201, one route selected based on a predetermined priority criterion (second priority criterion) is decided as the traveling route of the vehicle 1 in S203. In the present embodiment, the second priority criterion includes a car wash criterion regarding the position of the automatic car wash machine and a time criterion regarding the reach time at the destination. First, based on the car wash criterion, a route on which the automatic car wash machine is present between the current location and the departure location is preferentially selected. Next, based on the time criterion, a route with the earlier reach time at the destination is preferentially selected. That is, in a case where a plurality of routes on which the automatic car wash machine is present between the current location and the departure location is found in S201, from among the routes, the route with the earlier reach time at the destination is decided as the traveling route of the vehicle 1. That is, in a case where no route on which the automatic car wash machine is present between the current location and the departure location is found in S201, from among the routes found in S201, the route with the earlier reach time at the destination is decided as the traveling route of the vehicle 1.

In following S204, the computer 210 sets at least one automatic car wash machine present on the traveling route decided in S203 as the target car wash machine. In the present embodiment, one automatic car wash machine closest to the current location is set as the target car wash machine from among the automatic car wash machines present on the traveling route. It should be noted that the present disclosure is not limited to this, and the number of target car wash machines and the deciding method can be changed as appropriate. The set target car wash machine is stored in the storage device of the computer 210. In a case where the processing of S204 is executed, the series of processing shown in FIG. 7 (S24 of FIG. 5) ends, and the processing proceeds to S13 of FIG. 4.

In the present embodiment, the processing of S201, S202, and S205 is executed by the search unit 51. The processing of S203 is executed by the autonomous driving unit 52. Moreover, the processing of S204 is executed by the car wash unit 53. In a case where the routes that satisfy the service requirement and the car wash requirement (second requirement) are found by the second route search, the autonomous driving unit 52 decides one traveling route from among the routes in accordance with the predetermined second priority criterion (S203). Moreover, the autonomous driving unit 52 executes autonomous driving of the vehicle 1 along the decided traveling route in S16 of FIG. 4 described below. Due to such processing, it is possible to easily and smoothly execute autonomous driving of the vehicle 1.

Figure 9:
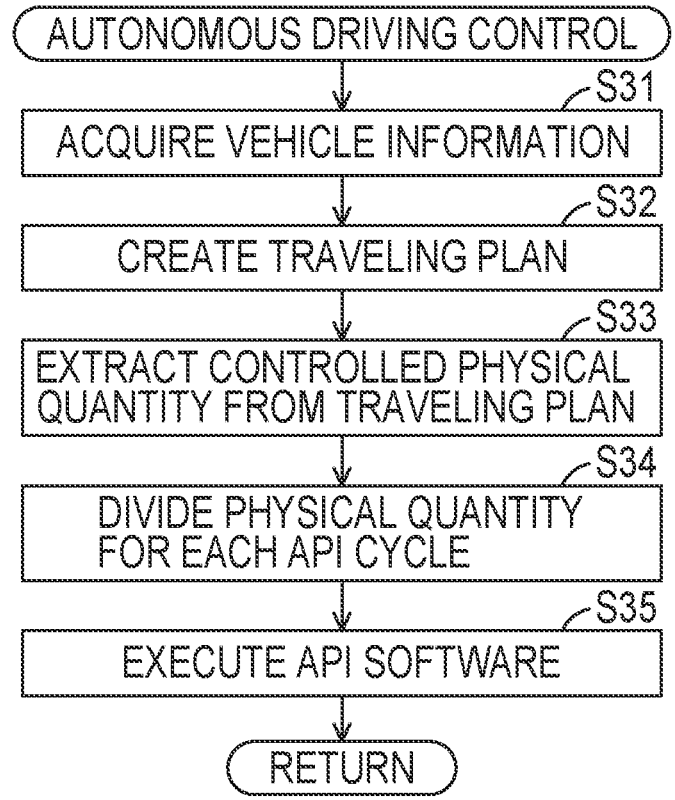
FIG. 9 is a flowchart showing details of processing related to autonomous driving control shown in FIG. 4.

With reference to FIG. 4 together with FIGS. 1 to 3 again, in S13, the computer 210 determines whether or not the vehicle 1 approaches the automatic car wash machine on the traveling route decided in S12. The computer 210 may make the determination of S13 based on the position of the automatic car wash machine in the periphery of the vehicle 1 and the current position of the vehicle 1. The computer 210 may acquire these positions from the NAVI 170. In addition, the computer 210 may determine whether or not the vehicle 1 approaches the automatic car wash machine based on whether or not the wireless communication between the vehicle 1 and the automatic car wash machine is started. Before autonomous driving is started in S16 described below, a NO determination is made in S13, and the processing proceeds to S16. In S16, the computer 210 executes the autonomous driving control. FIG. 9 is a flowchart showing the details of the processing related to the autonomous driving control (S16).

With reference to FIG. 9 together with FIGS. 1 to 3, in S31, the computer 210 acquires the current information of the vehicle 1. For example, the computer 210 acquires the environmental information and the posture information of the vehicle 1 from the recognition sensor 260 and the posture sensor 270. Further, the computer 210 acquires the API signal. In the present embodiment, the API signal indicating the state of the vehicle 1 is sequentially output from the VCIB 111 to the ADK 200 in real time regardless of whether the vehicle 1 is in any of the autonomous mode or the manual mode. In order to improve the accuracy of the autonomous driving control, the state of the vehicle 1 may be sequentially transmitted from the integrity control manager 115 to the ADK 200 in a shorter cycle in the autonomous mode than in the manual mode. The API signal acquired by the computer 210 includes, in addition to the autonomous state, signals indicating the rotation direction and the rotation speed of each wheel detected by the wheel speed sensors 127A, 127B.

In S32, the computer 210 creates the traveling plan along the traveling route decided in S12 of FIG. 4 based on the information of the vehicle 1 acquired in S31. For example, the computer 210 calculates the behavior of the vehicle 1 (for example, the posture of the vehicle 1) and creates the traveling plan suitable for the state of the vehicle 1 and the external environment. The traveling plan is data indicating a next operation of the vehicle 1 (behavior of the vehicle 1 in a predetermined period). The computer 210 creates the traveling plan such that the vehicle 1 can stably travel along the traveling route decided in S12 of FIG. 4. In a case where the traveling plan is already present, the traveling plan may be amended in S32.

In S33, the computer 210 extracts a controlled physical quantity (acceleration, tire turning angle, or the like) from the traveling plan created in S32. In S34, the computer 210 divides the physical quantity extracted in S33 for each API cycle. In S35, the computer 210 executes the API software by using the physical quantity divided in S34. By executing the API software in this way, the API command (propulsion direction command, propulsion command, braking command, vehicle fixing command, or the like) requesting control to realize the physical quantity in accordance with the traveling plan is transmitted from the ADK 200 to the VCIB 111. The VCIB 111 transmits the control command corresponding to the received API command to the integrity control manager 115, and the integrity control manager 115 executes the autonomous driving control of the vehicle 1 in response to the control command. During autonomous driving of the vehicle 1, the integrity control manager 115 (control device 150) controls various systems (for example, the brake system 121, the steering system 122, the powertrain system 123, the active safety system 125, and the body system 126 shown in FIG. 2) of the vehicle 1 in response to the command from the ADK 200 (computer 210).

In a case where the processing of S35 is executed, the processing returns to the flowchart of FIG. 4, and the processing proceeds to S17. In the present embodiment, the computer 210, the VCIB 111, and the integrity control manager 115 cooperate to execute control to cause the vehicle 1 to travel by autonomous driving. The vehicle 1 can be autonomously driven in any of the manned and unmanned states. It should be noted that the autonomous driving control is not limited to the control shown in FIG. 9, and other controls (known autonomous driving control) may be adopted.

With reference to FIG. 4 together with FIGS. 1 to 3 again, in S17, the computer 210 determines whether or not the task of the vehicle 1 (service provision by the vehicle 1) ends. When the vehicle 1 does not reach the destination, a NO determination is made in S17, and the processing proceeds to S19. In S19, the computer 210 determines whether or not the vehicle 1 is in the autonomous mode. During the service provision, the vehicle 1 is basically maintained in the autonomous mode. Therefore, a YES determination is made in S19, and the processing returns to the first step (S11). Moreover, S11, and S13 to S16 are repeatedly executed, and autonomous driving of the vehicle 1 is continued by the processing of S16 (FIG. 9).

In a case where the vehicle 1 during autonomous driving approaches the automatic car wash machine on the traveling route decided in S12 (YES in S13), in S14, the computer 210 determines whether or not the automatic car wash machine is the target car wash machine. In a case where the automatic car wash machine that the vehicle 1 approaches does not correspond to the target car wash machine set in S204 of FIG. 7, a NO determination is made in S14, and the processing proceeds to S16. Also in a case where the target car wash machine is not set (for example, in a case where the traveling route is decided by the first route search), a NO determination is made in S14, and the processing proceeds to S16.

In a case where the automatic car wash machine that the vehicle 1 approaches corresponds to the target car wash machine set in S204 of FIG. 7, a YES determination is made in S14, and the processing proceeds to S15. In S15, the computer 210 executes car wash control. In the present embodiment, the processing of S13 and S14 is executed by the car wash unit 53.

Figure 10:
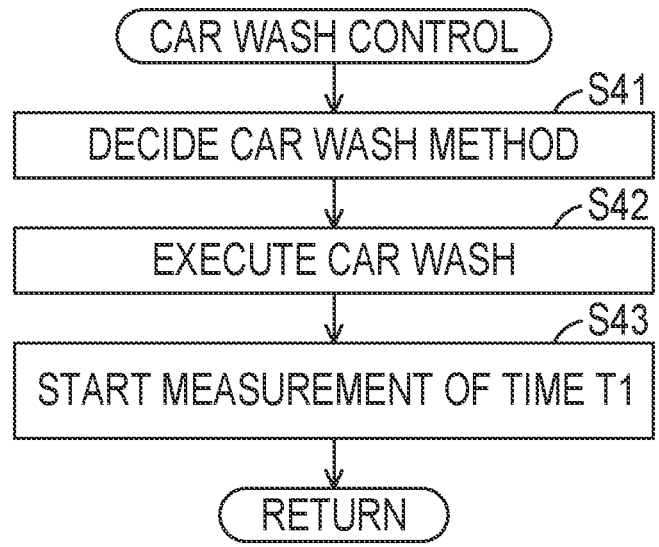
FIG. 10 is a flowchart showing details of processing related to car wash control shown in FIG. 4.

FIG. 10 is a flowchart showing the details of S15. With reference to FIG. 10 together with FIGS. 1 to 3, in S41, the computer 210 decides the car wash method. The computer 210 may decide a predetermined method in accordance with the task of the vehicle 1 as the car wash method. For example, in a case where the task of the vehicle 1 is the passenger transportation, water-repellent coating may be applied as a finish, and in a case where the task of the vehicle 1 is the physical distribution, finish coating may not be applied. In addition, a kind of a detergent may be changed in accordance with the task of the vehicle 1. In the present embodiment, in S41, washing a vehicle body surface of the vehicle 1 with a predetermined detergent and then applying the finish coating to the vehicle body surface is decided as the car wash method.

In S42, the target car wash machine washes the vehicle body surface of the vehicle 1 in accordance with the car wash method decided in S41. Specifically, the computer 210 requests the car wash in accordance with the method decided in S41 to the target car wash machine. As a result, the vehicle body surface (outer surface) of the vehicle 1 is washed by the target car wash machine. In a case where a person is not in the vehicle 1, the computer 210 may control a robot cleaner in the vehicle to clean the inside of the vehicle during the car wash by the target car wash machine. The computer 210 may determine whether or not a person is present in the vehicle 1 based on the output of the person presence sensor 40.

In a case where the car wash (S42) by the target car wash machine is completed, the computer 210 resets time T1 and starts the measurement of time T1 in S43. As a result, a time count by a timer is started from zero (initial value), and time T1 is sequentially updated as a time elapses. In the present embodiment, the elapsed time from a time when the car wash of the vehicle 1 is most recently executed (when the previous car wash is executed) is indicated by time T1. In a case where the processing of S43 is executed, the processing returns to the flowchart of FIG. 4, and the processing proceeds to S16. As a result, the vehicle 1 restarts traveling by autonomous driving.

In the present embodiment, the processing of S41 and S42 is executed by the car wash unit 53. The processing of S43 is executed by the search unit 51. The car wash unit 53 decides the target car wash machine from among the automatic car wash machines present on the route on which the autonomous driving unit 52 causes the vehicle 1 to travel by autonomous driving in a case where the second route search is executed (S204 of FIG. 7). The car wash unit 53 makes the request for the car wash of the vehicle 1 to the target car wash machine in a case where the automatic car wash machine that the vehicle 1 approaches corresponds to the target car wash machine (YES in both S13 and S14 of FIG. 4) (S42 of FIG. 10). With such a configuration, the automatic car wash machine (target car wash machine) that meets the needs of the vehicle 1 is selected from among the automatic car wash machines present on the autonomous driving route, and the request for the car wash of the vehicle 1 is made to the target car wash machine.

With reference to FIG. 4 together with FIGS. 1 to 3 again, when the vehicle 1 arrives at the departure location by autonomous driving (S16), the vehicle 1 is stopped and waits for the user to get on the vehicle. Before the user gets on the vehicle 1, the user executes the user authentication described above on the reader 180. In the present embodiment, the door of the vehicle 1 (passenger entrance) is opened when the user authentication is successful. Moreover, when the user who gets on the vehicle 1 closes the door, the vehicle 1 restarts traveling by autonomous driving.

When the vehicle 1 arrives at the destination by autonomous driving (S16), the vehicle 1 is stopped and waits for the user to get off the vehicle. Before the user gets off the vehicle 1, the user executes the user authentication described above on the reader 180. In a case where the user authentication is successful, the door of the vehicle 1 (passenger entrance) is opened. Thereafter, when the user gets off the vehicle 1, a YES determination is made in S17, and the vehicle 1 is in the manual mode in S18. A YES determination in S17 means that the task of the vehicle 1 (service provision by the vehicle 1) ends.

In a case where the vehicle 1 is in the manual mode (NO in S19), in S20, an end signal indicating the end of autonomous driving is transmitted from the vehicle 1 (communication device 130) to the server 500 together with the identification information of the vehicle 1, and then the series of processing shown in FIG. 4 ends.

As described above, the autonomous driving method according to the present embodiment includes the processing shown in each of FIGS. 4 to 7, 9, and 10. The computer 210 according to the present embodiment corresponds to an example of a "computer" according to the present disclosure.

In S22 of FIG. 5, the computer 210 determines whether or not a predetermined condition (car wash route search condition) is established. Specifically, the computer 210 determines whether or not the car wash route search condition is established based on whether or not predetermined time (Th1) has elapsed since the previous car wash. The car wash route search condition is established when predetermined time (Th1) has elapsed since the previous car wash.

In a case where the car wash route search condition is not established (NO in S22), the computer 210 executes the first route search in S23 of FIG. 5 (FIG. 6). The first route search searches for the route that satisfies the first requirement. The first requirement includes solely the service requirement (the vehicle 1 can reach the destination by a predetermined time) and does not include the car wash requirement (the presence of the automatic car wash machine on the route) (S101 of FIG. 6).

In a case where the car wash route search condition is established (YES in S22), the computer 210 executes the second route search in S24 of FIG. 5 (FIG. 7). The second route search searches for the route that satisfies the second requirement. The second requirement includes the car wash requirement (the presence of the automatic car wash machine on the route) in addition to the service requirement (S201 of FIG. 7).

In S16 of FIG. 4, the computer 210 executes autonomous driving of the vehicle 1 along the route found by the first route search or the second route search.

With the autonomous driving method described above, it is easy to execute the car wash of the vehicle 1 (autonomous driving vehicle) at an appropriate frequency. Therefore, an insufficient wash of the vehicle 1 (autonomous driving vehicle) can be suppressed.

In the following, an example of the autonomous driving method will be described with reference to FIGS. 11 and 12.

Figure 11:
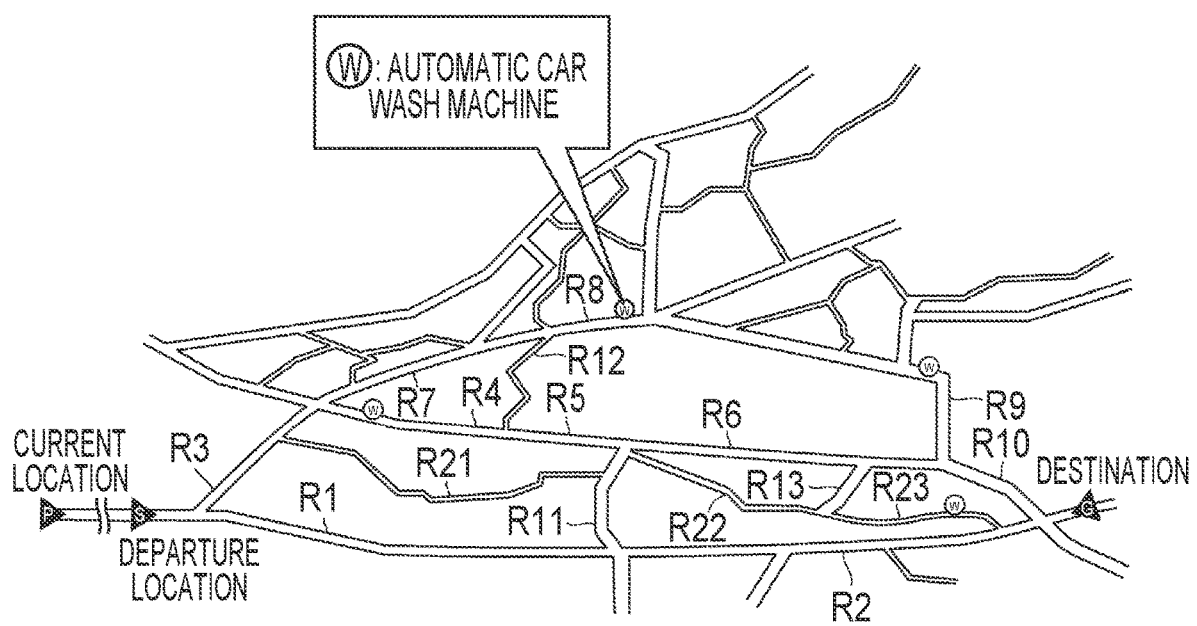
FIG. 11 is a diagram showing an example of a disposition of each automatic car wash machine on a map.

FIG. 11 is a diagram showing an example of a disposition of each automatic car wash machine on the map. In FIG. 11, "W" means the automatic car wash machine (for example, the automatic car wash machine 300 shown in FIG. 8). FIG. 12 is a table showing the success or failure of each service requirement and car wash requirement for each route candidate (RT-1 to RT-22) on the map shown in FIG. 11. In FIG. 12, R1 to R13, R21 to R23 mean roads R1 to R13, R21 to R23 in FIG. 11, respectively. In the example described below, it is assumed that the automatic car wash machine is not present between the current location and the departure location. In addition, it is also assumed that each of the roads R5, R6 in FIG. 11 is congested.

With reference to FIG. 12 together with FIG. 11, since each of the roads R5, R6 in FIG. 11 is congested, a determination is made that the route including any of the roads R5, R6 (RT-2, RT-3, RT-6 to RT-12, RT-18 to RT-22) does not satisfy the service requirement in each of S101 of FIG. 6 and S201 of FIG. 7. In addition, since the routes (RT-16, RT-17) that include the roads R8, R9 in FIG. 11 have a long traveling distance, a determination is made that the service requirement is not satisfied in each of S101 of FIG. 6 and S201 of FIG. 7. In "service requirement" in FIG. 12, "-" means that the service requirement is not satisfied, and each of A, B, C, D, E, and F means that the service requirement is satisfied.

In the present example, in a case where the routes that satisfy the service requirement are arranged in order of the reach time at the destination, RT-1 (A), RT-4 (B), RT-15 (C), RT-13 (D), RT-5 (E), and RT-14 (F). Therefore, in S103 of FIG. 6, RT-1 is decided as the traveling route of the vehicle 1.

In FIG. 12, "car wash requirement" indicates the number of the automatic car wash machines on each route. A determination is made that the route that does not include the automatic car wash machine (RT-1 to RT-3, RT-5, RT-11, RT-14, RT-15, RT-18, RT-21, RT-22) does not satisfy the car wash requirement in S201 of FIG. 7. Moreover, a determination is made that each of RT-4, RT-13 satisfies the service requirement and satisfies the car wash requirement. In S203 of FIG. 7, out of RT-4, RT-13, RT-4 with the earlier reach time at the destination is decided as the traveling route of the vehicle 1. Moreover, in S204 of FIG. 7, the automatic car wash machine on RT-4 (specifically, the automatic car wash machine on the road R23) is set as the target car wash machine.

The example of the autonomous driving method has been described above. Subsequently, an example in which the example described above is changed will be described.

In a first modification example of FIG. 12, it is assumed that the road R1 is congested in addition to the roads R5, R6. In such an example, a determination is made that the routes (RT-1 to RT-5) that include the road R1 do not satisfy the service requirement. In this case, RT-13 to RT-15 satisfy the service requirement, and solely RT-13 satisfies both the service requirement and the car wash requirement. In S103 of FIG. 6, from among the routes (RT-13 to RT-15) that satisfy the service requirement, RT-15 with the earliest reach time at the destination is decided as the traveling route of the vehicle 1. In S203 of FIG. 7, RT-13 is decided as the traveling route of the vehicle 1. In S204 of FIG. 7, the automatic car wash machine on RT-13 (specifically, the automatic car wash machine on the road R23) is set as the target car wash machine.

In a second modification example of FIG. 12, one automatic car wash machine is present between the current location and the departure location shown in FIG. 11, and all the routes RT-1 to RT-22 satisfy the car wash requirement. In such an example, from among the routes (RT-1, RT-4, RT-15, RT-13, RT-5, and RT-14) that satisfy both the service requirement and the car wash requirement, RT-1 with the earliest reach time at the destination is decided as the traveling route of the vehicle 1 in S203 of FIG. 7. Moreover, the automatic car wash machine present between the current location and the departure location is set as the target car wash machine in S204 of FIG. 7.

Second Embodiment

A computer and an autonomous driving method according to a second embodiment of the present disclosure will be described. Since the second embodiment has many parts in common with the first embodiment, a difference thereof will be mainly described, and the description of the common parts will be omitted.

In the second embodiment, the vehicle 1 is shared between a first user and a second user. The vehicle 1 according to the second embodiment also has the configuration shown in FIGS. 1 to 3, similarly to the first embodiment. The first user and the second user separately carry the mobile terminal UT. In the following, the mobile terminal UT carried by the first user is referred to as "first mobile terminal", and the mobile terminal UT carried by the second user is referred to as "second mobile terminal".

In a first usage period, the first user uses the vehicle 1 for a predetermined use (first use). In the first usage period, the vehicle 1 executes autonomous driving for the first use (first autonomous driving) in response to a request from the first user. In the present embodiment, the first use (vehicle use of the first user) corresponds to the first task. In a second usage period set after the first usage period, the second user uses the vehicle 1 for a predetermined use (second use). In the second usage period, the vehicle 1 executes autonomous driving for the second use (second autonomous driving) in response to a request from the second user. In the present embodiment, the second use (vehicle use of the second user) corresponds to the second task. Further, a handover period for handing over the vehicle 1 is provided between the usage periods. Specifically, the handover period for handing over the vehicle 1 from the first user to the second user is provided between the end of the first usage period and the start of the second usage period.

In the first usage period, in a case where the first user who gets on the vehicle 1 executes a predetermined operation on the first mobile terminal, the first mobile terminal in the vehicle transmits a first service request signal to the vehicle 1 (communication device 130). The first service request signal includes the destination and the reach time at the destination (request reach time) for autonomous driving requested to the vehicle 1. The first service request signal requests the route search in which the current location of the vehicle 1 is the first point (start point) and the destination is the second point (end point) and autonomous driving to the vehicle 1. Further, the first service request signal requests the vehicle 1 to reach the destination by the request reach time. The service requirement (for example, the destination and the request reach time) input by the first user to the first mobile terminal is included in the first service request signal. The request reach time is set within the first usage period. The current location of the vehicle 1 corresponds to the start point of the first task.

In a case where the vehicle 1 receives the first service request signal described above, the integrity control manager 115 puts the vehicle 1 into the autonomous mode, and then the ADK 200 starts the series of processing shown in FIG. 4. It should be noted that, in S12 of FIG. 4, instead of the processing shown in FIG. 5, a series of processing shown in FIG. 13 described below is executed. FIG. 13 is a flowchart showing details of processing (S12 of FIG. 4) related to the traveling route decision in the autonomous driving method according to the second embodiment. The processing shown in FIG. 13 is the same as the processing shown in FIG. 5 except that S21A and S21B are adopted instead of S21 (FIG. 5).

With reference to FIG. 13 together with FIGS. 1 to 3, in S21A, the computer 210 acquires the current location and the destination. The destination is indicated by the first service request signal. The computer 210 may acquire the current location of the vehicle 1 by using the output of the posture sensor 270 or the NAVI 170, for example.

In S21B, the computer 210 determines whether or not the handover of the vehicle 1 is requested. Since the first service request signal does not request the handover of the vehicle 1, a NO determination is made in S21B, and the processing proceeds to S22.

In the second embodiment, the route from the current location of the vehicle 1 to the destination is searched for in each of S23 and S24 of FIG. 13. Moreover, in a case where the first usage period ends, a YES determination is made in S17, and the series of processing shown in FIG. 4 ends via S18 to S20.

In a case where the first usage period ends, the handover period is started. A second service request signal is transmitted from the server 500 to the vehicle 1 (communication device 130) at the start time of the handover period. The second service request signal requests the handover of the vehicle 1 from the first user to the second user. Specifically, the second service request signal includes the destination and the reach time at the destination (request reach time) for autonomous driving requested to the vehicle 1. The second service request signal requests the route search in which the current location of the vehicle 1 is the first point (start point) and the destination is the second point (end point) and autonomous driving to the vehicle 1. Further, the second service request signal requests the vehicle 1 to execute autonomous driving in the unmanned state to reach the destination by the request reach time. The service requirement (for example, the destination and the request reach time) requested by the second service request signal is set by the server 500. The request reach time is set before the start time of the second usage period. The destination is set to the start point of the second task. The current location of the vehicle 1 corresponds to the end point of the first task.

In a case where the vehicle 1 receives the second service request signal described above, the integrity control manager 115 puts the vehicle 1 into the autonomous mode, and then the ADK 200 starts the series of processing shown in FIG. 4. Moreover, in S12 of FIG. 4, the processing shown in FIG. 13 is executed. Since the second service request signal requests the handover of the vehicle 1, a YES determination is made in S21B, and the processing proceeds to S24. A YES determination in S21B means that the car wash route search condition is established. In the route search in response to the second service request signal, in S204 of FIG. 7, one automatic car wash machine closest to the destination (start point of the second task) may be set as the target car wash machine.

As described above, in the second embodiment, the car wash route search condition is established in the route search in which the end point of the first task is the first point and the start point of the second task is the second point. By executing the car wash between the end of the first task and the start of the second task, from when the first user uses the vehicle 1 to when the first user hands over the vehicle 1 to the next user (second user), the vehicle 1 can be kept clean.

In addition, by executing the car wash at a position close to the start point of the second task, the cleanliness of the vehicle 1 when the second user receives the vehicle 1 can be improved.

When the vehicle 1 arrives at the destination (start point of the second task), a YES determination is made in S17 of FIG. 4, and the series of processing shown in FIG. 4 ends via S18 to S20. Thereafter, the second usage period is started. The second user gets on the vehicle 1 at the start point of the second task.

In the second usage period, in a case where the second user who gets on the vehicle 1 executes the predetermined operation on the second mobile terminal, the second mobile terminal in the vehicle transmits a third service request signal to the vehicle 1 (communication device 130). The third service request signal includes the destination and the reach time at the destination (request reach time) for autonomous driving requested to the vehicle 1. The third service request signal requests the route search in which the current location of the vehicle 1 is the first point (start point) and the destination is the second point (end point) and autonomous driving to the vehicle 1. Further, the third service request signal requests the vehicle 1 to reach the destination by the request reach time. The service requirement (for example, the destination and the request reach time) input by the second user to the second mobile terminal is included in the third service request signal. The request reach time is set within the second usage period. The current location of the vehicle 1 corresponds to the start point of the second task.

In a case where the vehicle 1 receives the third service request signal described above, the integrity control manager 115 puts the vehicle 1 into the autonomous mode, and then the ADK 200 starts the series of processing shown in FIG. 4. The processing related to autonomous driving in response to the third service request signal is basically the same as the processing related to autonomous driving in response to the first service request signal described above.

Another Embodiment

In each of the embodiments described above, the car wash route search condition is established in a case where predetermined time (Th1) has elapsed since the previous car wash (see, for example, S22 of FIG. 5). However, the present disclosure is not limited to this, the car wash route search condition may be established in a case where the traveling distance since the previous car wash of the vehicle 1 exceeds the predetermined value.

For example, the computer 210 may execute the processing shown in FIG. 14 instead of the processing shown in FIG. 10. FIG. 14 is a flowchart showing a modification example of the processing shown in FIG. 10. The processing shown in FIG. 14 is the same as the processing shown in FIG. 10 except that S43A is adopted instead of S43 (FIG. 10). In S43A, the computer 210 resets a distance T2 and starts the measurement of the distance T2. The distance T2 is stored, for example, in the storage device of the computer 210. Each time the car wash of the vehicle 1 is executed, the distance T2 is reset and measurement (accumulation) of the distance T2 is started. The distance T2 corresponds to the traveling distance of the vehicle 1 since the previous car wash. The traveling distance of the vehicle 1 with reference (zero point) to a time when the car wash of the vehicle 1 is most recently executed (when the previous car wash is executed) is indicated by the distance T2.

Figure 15:
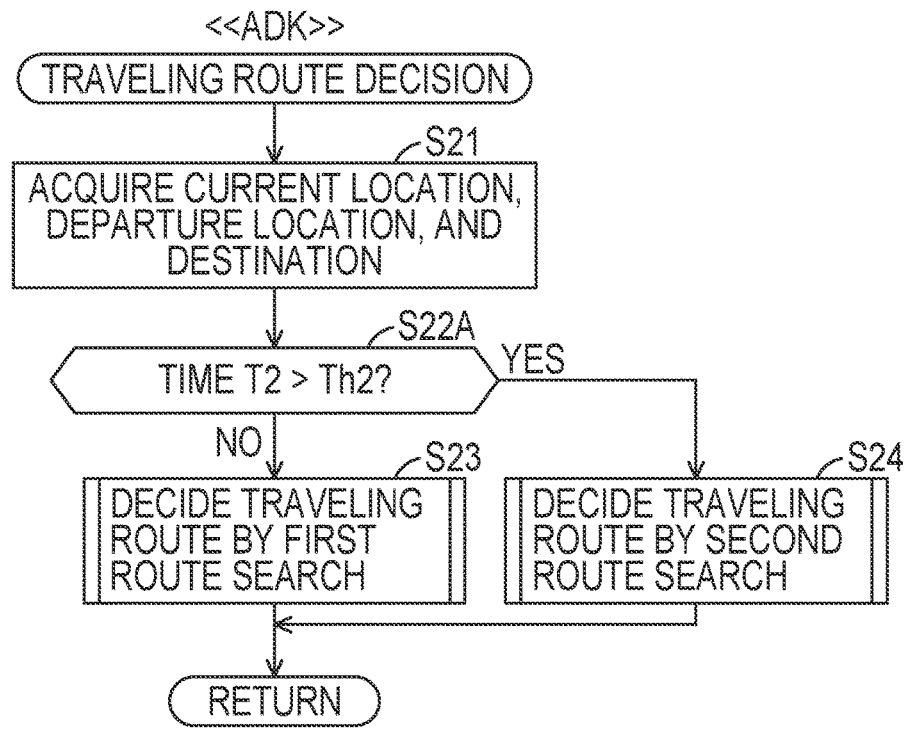
FIG. 15 is a flowchart showing a modification example of the processing shown in FIG. 5.

Further, the computer 210 may execute the processing shown in FIG. 15 instead of the processing shown in FIG. 5.

FIG. 15 is a flowchart showing a modification example of the processing shown in FIG. 5. The processing shown in FIG. 15 is the same as the processing shown in FIG. 5 except that S22A is adopted instead of S22 (FIG. 5). In S22A, the computer 210 determines whether or not the distance T2 for which the measurement is started in S43A of FIG. 14 exceeds a predetermined threshold value (hereinafter, referred to as "Th2"). Th2 may be a fixed value or may be variable. The computer 210 may decide Th2 by using at least one of weather information and the kind of the task of the vehicle 1.

It is considered that the cleanliness of the vehicle 1 is decreased as the traveling distance of the vehicle 1 since the previous car wash is increased. Therefore, in a case where the car wash route search condition is set as described above, it is easy for the car wash route search condition to be established at a time when the car wash is needed.

In each of the embodiments described above, in a case where the route that satisfies the predetermined requirement is not found in the route search (NO in S102 of FIG. 6 or S202 of FIG. 7), autonomous driving by the vehicle 1 is not started. However, such a configuration is not always needed. For example, autonomous driving by the vehicle 1 may be started in a case where a predetermined start condition is established.

Figure 16:
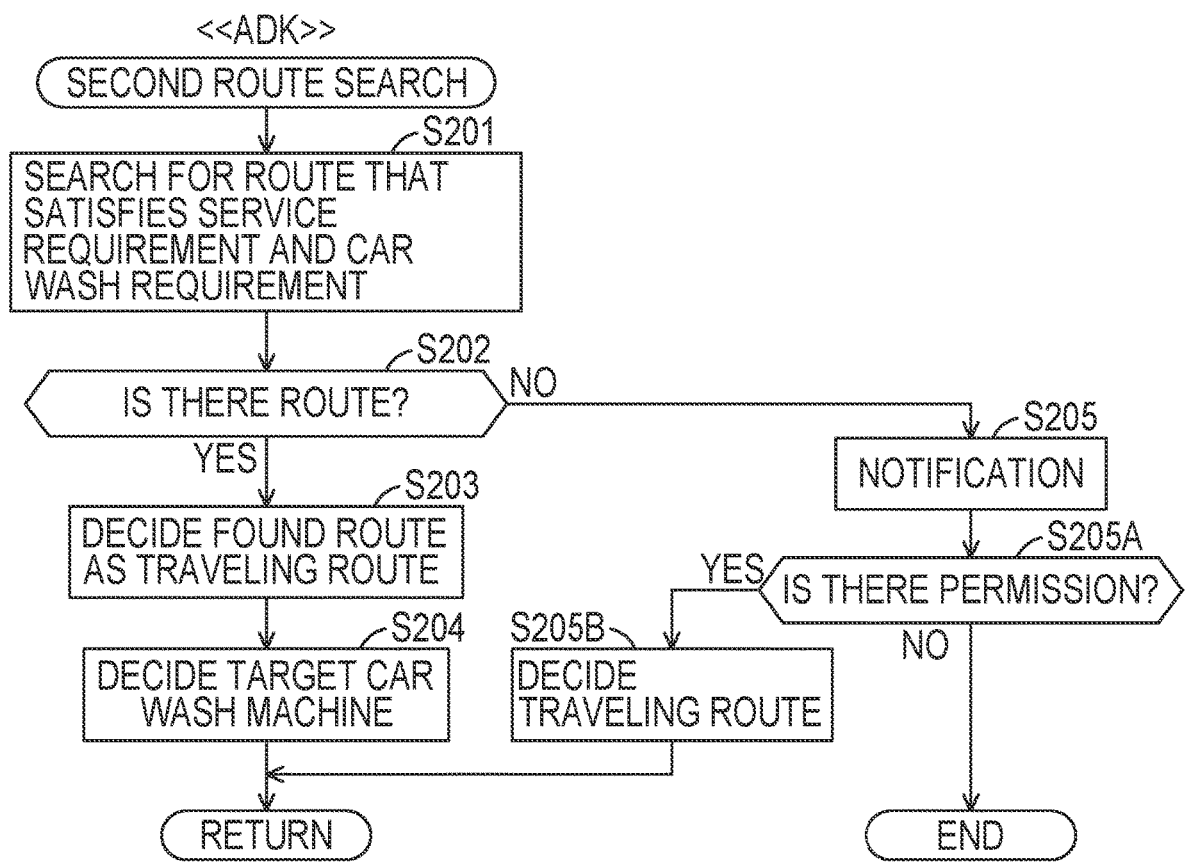
FIG. 16 is a flowchart showing a modification example of the processing shown in FIG. 7.

The computer 210 may execute the processing shown in FIG. 16 instead of the processing shown in FIG. 7. FIG. 16 is a flowchart showing a modification example of the processing shown in FIG. 7. The processing shown in FIG. 16 is the same as the processing shown in FIG. 7 except that S205A and S205B are added.

With reference to FIG. 16 together with FIGS. 1 to 3, the computer 210 waits for a return from the server 500 after transmitting the non-conformity notification to the server 500 in S205. On the other hand, the server 500 that receives the non-conformity notification from the vehicle 1 transmits a signal indicating that no route that satisfies the requirement is found to the user terminal (for example, the mobile terminal UT). The user terminal is a terminal belonging to the user who uses the vehicle 1. In a case where the signal is received from the server 500, the user terminal requests the user to select whether or not to permit autonomous driving. In addition, in a case where the user permits autonomous driving, the user terminal displays each route candidate found in S201 on the map together with the destination reach time (expected time) for each route, and requests the user to select any route as the traveling route. In a case where the user inputs information requested by the user terminal to the user terminal, a signal indicating an input result of the user is transmitted from the user terminal to the server 500. In a case where the server 500 receives the signal described above from the user terminal, the server 500 transmits a user signal indicating the input result of the user to the computer 210.

In a case where the user signal is received from the server 500, the computer 210 determines in S205A whether or not autonomous driving is permitted based on the user signal (input result of the user). In a case where the user permits autonomous driving (YES in S205A), the computer 210 decides the route selected by the user (route indicated by the user signal) as the traveling route in S205B. As a result, the series of processing shown in FIG. 7 (S24 of FIG. 5) ends, and the processing proceeds to S13 of FIG. 4. In this case, autonomous driving by the vehicle 1 is started by S16 of FIG. 4. On the other hand, in a case where the user does not permit autonomous driving (NO in S205A), the series of processing shown in FIG. 4 ends together with the series of processing shown in FIG. 7. In this case, autonomous driving by the vehicle 1 is not started.

It should be noted that steps corresponding to S205A and S205B may be added to the processing shown in FIG. 6. In addition, in a case where the routes that satisfy the predetermined requirement are found in S103 of FIG. 6 or S203 of FIG. 7, the user may select one traveling route.

At least part of the functions of the computer 210 according to each of the embodiments described above (in particular, the functions of the search unit 51, the autonomous driving unit 52, and the car wash unit 53 shown in FIG. 3) may be implemented on the cloud by cloud computing, or may be implemented in the control device 150. For example, the control device 150 may execute the processing shown in FIGS. 4 to 7, 9, and 10 instead of the computer 210. In such a form, the control device 150 functions as an example of a "computer" according to the present disclosure.

At least part of the functions of the computer 210 according to each of the embodiments described above (in particular, the functions of the search unit 51, the autonomous driving unit 52, and the car wash unit 53 shown in FIG. 3) may be implemented in the mobile terminal UT. For example, the search unit 51, the autonomous driving unit 52, and the car wash unit 53 may be embodied by the mobile application. The mobile terminal UT may execute the processing shown in FIGS. 4 to 7, 9, and 10 instead of the computer 210. The mobile terminal UT may acquire the information from each of the vehicle 1 and the server 500 or may request the vehicle control to the vehicle 1, as needed. In such a form, the mobile terminal UT functions as an example of a "computer" according to the present disclosure.

At least part of the functions of the computer 210 according to each of the embodiments described above (in particular, the functions of the search unit 51, the autonomous driving unit 52, and the car wash unit 53 shown in FIG. 3) may be implemented in the on-premises server (server 500). The server 500 may execute the processing shown in FIGS. 4 to 7, 9, and 10 instead of the computer 210. The server 500 may acquire the information from each of the vehicle 1 and the mobile terminal UT or may request the vehicle control to the vehicle 1, as needed. In such a form, the server 500 functions as an example of a "computer" according to the present disclosure.

The configuration of the vehicle is not limited to the configuration described in the embodiment described above (see FIGS. 1 to 3). The base vehicle may have an autonomous driving function without retrofitting. A level of autonomous driving may be fully autonomous driving (level 5) or conditional autonomous driving (for example, level 4). The configuration of the vehicle may be changed to a configuration dedicated to unmanned traveling, as appropriate. For example, a vehicle dedicated to unmanned traveling does not have to include the component (steering wheel or the like) for a person to operate the vehicle.

The vehicle may include a solar panel or may have a flight function. The vehicle may include a charger for traveling charging or contactless charging. The vehicle is not limited to a passenger car, and may be a bus or a truck. The vehicle may be a privately owned vehicle (POV). The vehicle may be a multipurpose vehicle customized in accordance with the user's purpose of use. The vehicle may be a mobile store vehicle, an automated guided vehicle (AGV), or an agricultural machine. The vehicle may be an unmanned or one-passenger small BEV (for example, a Micro Pallet).

The embodiment and each modification example described above may be carried out in any combination.

The embodiment disclosed this time should be considered to be exemplary examples and not to be restrictive in all respects. The technical scope of the present disclosure is shown by the scope of claims rather than the description of the embodiment described above, and is intended to include all changes within the meaning and scope equivalent to the scope of claims.

What is claimed is:

1. A computer comprising a processor configured to:
   determine an elapsed time since a previous car wash of a vehicle;
   determine a threshold time based on a task associated with the vehicle and weather information such that the threshold time is higher when the weather is rainy than when the weather is sunny;
   determine whether the elapsed time is greater than the determined threshold time;
   upon determination that the elapsed time is greater than the determined threshold time:
     search for a route from a first point to a second point;
     execute autonomous driving of the vehicle along the route;
     execute a first route search for a first route that satisfies a first requirement in a case where a predetermined condition is not established; and
     execute a second route search for a second route that satisfies a second requirement in a case where the predetermined condition is satisfied,
   wherein the first requirement does not include presence of an automatic car wash machine on the route from the first point to the second point;
   wherein the second requirement includes the presence of a predetermined number of the automatic car wash machines on the route from the first point to the second point, and
   wherein the processor is configured to:
     when the predetermined condition is satisfied in the automatic operation performed by the vehicle to provide a service, determine a car wash method according to the service to be provided by the vehicle among a plurality of predetermined services; and
     request the automatic car wash on the route found by the second route search to wash the vehicle according to the determined car wash method,
   wherein the predetermined service includes passenger transportation and logistics.

2. The computer according to claim 1, wherein:
   the vehicle is configured to execute first autonomous driving for a first task, and then execute second autonomous driving for a second task; and
   the determined route is a route from the first point to the second point, in which an end point of the first task is the first point and a start point of the second task is the second point.

3. The computer according to claim 1, wherein the route is determined such that the vehicle is able to reach the second point by a predetermined time.

4. The computer according to claim 1, wherein the processor is configured to:
   decide a target car wash machine from among a plurality of automatic car wash machines present on the determined route, and
   request the automatic car wash in a case where an automatic car wash machine that the vehicle approaches corresponds to the target car wash machine.

5. A server comprising the computer according to claim 1.

6. The computer according to claim 1, wherein the processor is configured to:
when the service that the vehicle provides is a passenger transportation, determine a car wash method in which water-repellent coating is applied as a finish; and
when the service that the vehicle provides is a physical distribution, determine a car wash method in which the water-repellent coating is not applied as a finish.

7. A vehicle comprising:
a processor configured to:
determine an elapsed time since a previous car wash of a vehicle;
determine a threshold time based on a task associated with the vehicle and weather information such that the threshold time is higher when the weather is rainy than when the weather is sunny;
determine whether the elapsed time is greater than the determined threshold time;
upon determination that the elapsed time is greater than the determined threshold time:
search for a route from a first point to a second point;
execute autonomous driving of the vehicle along the route;
execute a first route search for a first route that satisfies a first requirement in a case where a predetermined condition is not established; and
execute a second route search for a second route that satisfies a second requirement in a case where the predetermined condition is satisfied, wherein
the first requirement does not include presence of an automatic car wash machine on the route from the first point to the second point;
the second requirement includes the presence of a predetermined number of the automatic car wash machines on the route from the first point to the second point, and
when the predetermined condition is satisfied in the automatic operation performed by the vehicle to provide a service, determine a car wash method according to the service to be provided by the vehicle among a plurality of predetermined services; and
request the automatic car wash on the route found by the second route search to wash the vehicle according to the determined car wash method,
wherein the predetermined service includes passenger transportation and logistics.

8. A computer comprising a processor configured to:
determine a distance traveled by the vehicle since a previous car wash of a vehicle;
determine a threshold distance based on a service provided by the vehicle;
determine whether the distance traveled is greater than the determined threshold distance;
upon determination that the elapsed time is greater than the determined threshold distance:
search for a route from a first point to a second point;
execute autonomous driving of the vehicle along the route;
execute a first route search for a first route that satisfies a first requirement in a case where a predetermined condition is not established; and
execute a second route search for a second route that satisfies a second requirement in a case where the predetermined condition is satisfied, wherein
the first requirement does not include presence of an automatic car wash machine on the route from the first point to the second point;
the second requirement includes the presence of a predetermined number of the automatic car wash machines on the route from the first point to the second point, and
when the predetermined condition is satisfied in the automatic operation performed by the vehicle to provide a service, determine a car wash method according to the service to be provided by the vehicle among a plurality of predetermined services; and
request the automatic car wash on the route found by the second route search to wash the vehicle according to the determined car wash method,
wherein the predetermined service includes passenger transportation and logistics.

9. The computer according to claim 8, wherein the processor is configured to:
when the service that the vehicle provides is a passenger transportation, determine a car wash method in which water-repellent coating is applied as a finish; and
when the service that the vehicle provides is a physical distribution, determine a car wash method in which the water-repellent coating is not applied as a finish.

* * * * *